US008584932B2

(12) United States Patent
Yoshida

(10) Patent No.: US 8,584,932 B2
(45) Date of Patent: Nov. 19, 2013

(54) INFORMATION INPUT/OUTPUT APPARATUS, INFORMATION PROCESSING APPARATUS, INFORMATION INPUT/OUTPUT SYSTEM, PRINTING MEDIUM, AND INFORMATION INPUT/OUTPUT METHOD

(76) Inventor: Kenji Yoshida, Tokyo (JP)

( * ) Notice: Subject to any disclaimer, the term of this patent is extended or adjusted under 35 U.S.C. 154(b) by 0 days.

(21) Appl. No.: 13/393,872

(22) PCT Filed: Sep. 3, 2010

(86) PCT No.: PCT/JP2010/065118
§ 371 (c)(1),
(2), (4) Date: Mar. 2, 2012

(87) PCT Pub. No.: WO2011/027853
PCT Pub. Date: Mar. 10, 2011

(65) Prior Publication Data
US 2012/0153020 A1    Jun. 21, 2012

(30) Foreign Application Priority Data

Sep. 4, 2009  (JP) .................. 2009-205058
Jul. 13, 2010  (JP) .................. 2010-159109

(51) Int. Cl.
*G06K 17/00*    (2006.01)
(52) U.S. Cl.
USPC .......................... 235/375; 235/487

(58) Field of Classification Search
USPC ................... 235/375, 376, 436, 487
See application file for complete search history.

(56) References Cited

U.S. PATENT DOCUMENTS

2001/0042234 A1* 11/2001 Sasaki et al. ............... 714/752
2006/0154559 A1   7/2006 Yoshida

FOREIGN PATENT DOCUMENTS

JP    2004021899 A    1/2004
JP    2009026311       2/2009

OTHER PUBLICATIONS

International Search Report for International Application No. PCT/JP2010/065118, completed on Nov. 29, 2010 and mailed on Dec. 7, 2010.

* cited by examiner

*Primary Examiner* — Edwyn Labaze
(74) *Attorney, Agent, or Firm* — Duane Morris LLP

(57) ABSTRACT

Continuous output of content data is aimed in output of content data using a dot pattern. In the information processing method of the invention, by storing a content data file that stores content data or a dot code signified by a dot pattern and also has a function as instruction information that indicates other content data to be continuously output after outputting the desired content data, the content data can be continuously output.

19 Claims, 31 Drawing Sheets

| $I_3$ | $I_4$ | $I_5$ |
|---|---|---|
| $I_2$ | $I_1$ | $I_6$ |

| $I_3$ | $I_4$ | $I_5$ |
|---|---|---|
| $I_2$ | $I_1$ | $I_6$ |
| $I_9$ | $I_8$ | $I_7$ |

| $I_5$ | $I_6$ | $I_7$ |
|---|---|---|
| $I_4$ | $I_1$ | $I_8$ |
| $I_3$ | $I_2$ | $I_9$ |
| $I_{12}$ | $I_{11}$ | $I_{10}$ |

| $I_{36}$ | $I_{17}$ | $I_{18}$ | $I_{19}$ | $I_{20}$ | $I_{21}$ |
|---|---|---|---|---|---|
| $I_{35}$ | $I_{16}$ | $I_5$ | $I_6$ | $I_7$ | $I_{22}$ |
| $I_{34}$ | $I_{15}$ | $I_4$ | $I_1$ | $I_8$ | $I_{23}$ |
| $I_{33}$ | $I_{14}$ | $I_3$ | $I_2$ | $I_9$ | $I_{24}$ |
| $I_{32}$ | $I_{13}$ | $I_{12}$ | $I_{11}$ | $I_{10}$ | $I_{25}$ |
| $I_{31}$ | $I_{30}$ | $I_{29}$ | $I_{28}$ | $I_{27}$ | $I_{26}$ |

6 × 6

DOT CODE FORMAT

FIG. 9A

| C31 | C30 | C29 | C28 | C27 | C26 | C25 | C24 | C23 | C22 | C21 | C20 | C19 | C18 | C17 | C16 | C15 | C14 | C13 | C12 | C11 | C10 | C9 | C8 | C7 | C6 | C5 | C4 | C3 | C2 | C1 | C0 |
|---|---|---|---|---|---|---|---|---|---|---|---|---|---|---|---|---|---|---|---|---|---|---|---|---|---|---|---|---|---|---|---|
| 0 | PARITY | | | | | | | | | | | | | | | CODE VALUE | | | | | | | | | | | | | | | |

FIG. 9B

| C31 | C30 | C29 | C28 | C27 | C26 | C25 | C24 | C23 | C22 | C21 | C20 | C19 | C18 | C17 | C16 | C15 | C14 | C13 | C12 | C11 | C10 | C9 | C8 | C7 | C6 | C5 | C4 | C3 | C2 | C1 | C0 |
|---|---|---|---|---|---|---|---|---|---|---|---|---|---|---|---|---|---|---|---|---|---|---|---|---|---|---|---|---|---|---|---|
| 0 | PARITY | | | | | | | CODE VALUE | | | | | | | | Y COORDINATE | | | | | | | | X COORDINATE | | | | | | | |

FIG. 9C

| C31 | C30 | C29 | C28 | C27 | C26 | C25 | C24 | C23 | C22 | C21 | C20 | C19 | C18 | C17 | C16 | C15 | C14 | C13 | C12 | C11 | C10 | C9 | C8 | C7 | C6 | C5 | C4 | C3 | C2 | C1 | C0 |
|---|---|---|---|---|---|---|---|---|---|---|---|---|---|---|---|---|---|---|---|---|---|---|---|---|---|---|---|---|---|---|---|
| 0 | PARITY | | | | | | | COORDINATE INDEX | | | | | | | | Y COORDINATE | | | | | | | | X COORDINATE | | | | | | | |

POSITION WHERE REFERENCE DOT IS SUPPOSED TO BE ARRANGED

FIG. 14A 3×4
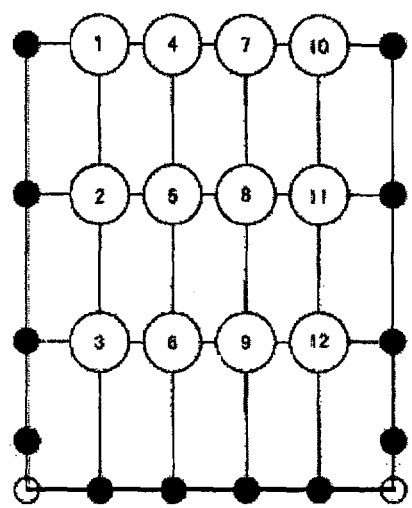
FIG. 14B 2×4×2
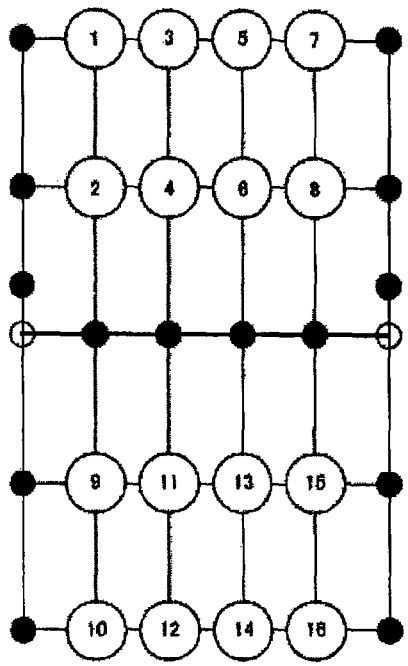
FIG. 14C 4×6
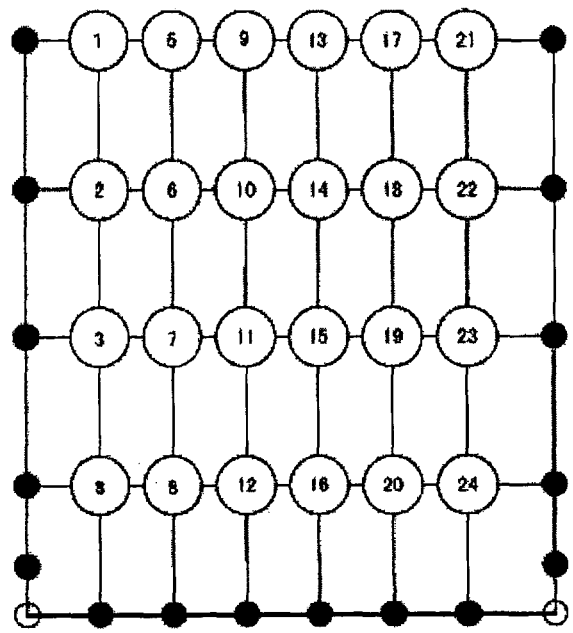

PARITY    CODE VALUE

| LINK TABLE | |
|---|---|
| CODE VALUE | FILE NAME (OR ADDRESS) |
| 559 | ■■■■■■■■ |
| 560 | B-1 |
| | B-2 |
| | B-3 |
| | B-4 |
| 561 | ■■■■■■■■ |

| CONTENT FILE | |
|---|---|
| FILE NAME (OR ADDRESS) | CONTENT DATA |
| B-1 | Good morning. (SOUND CONTENT) |
| B-2 | How are you ? (SOUND CONTENT) |
| B-3 | I'm fine. Thank you. (SOUND CONTENT) |
| B-4 | And you ? (SOUND CONTENT) |
| ■■■ | ■■■■■■■■■■■ |

| PARITY | CODE VALUE (AFTER NEXT) 560 | CODE VALUE (NEXT) 583 | CODE VALUE (UNIQUE) 572 |

| PARITY | CODE VALUE (NEXT) 583 | CODE VALUE (PREVIOUS) 556 | CODE VALUE (UNIQUE) 572 |

| PARITY | CODE VALUE (AFTER NEXT) −12 | CODE VALUE (NEXT) +11 | CODE VALUE (UNIQUE) 572 |

| PARITY | CODE VALUE (AFTER NEXT) −7 | CODE VALUE (NEXT) +5 | CODE VALUE (UNIQUE) 180 | X COORDINATE | Y COORDINATE |

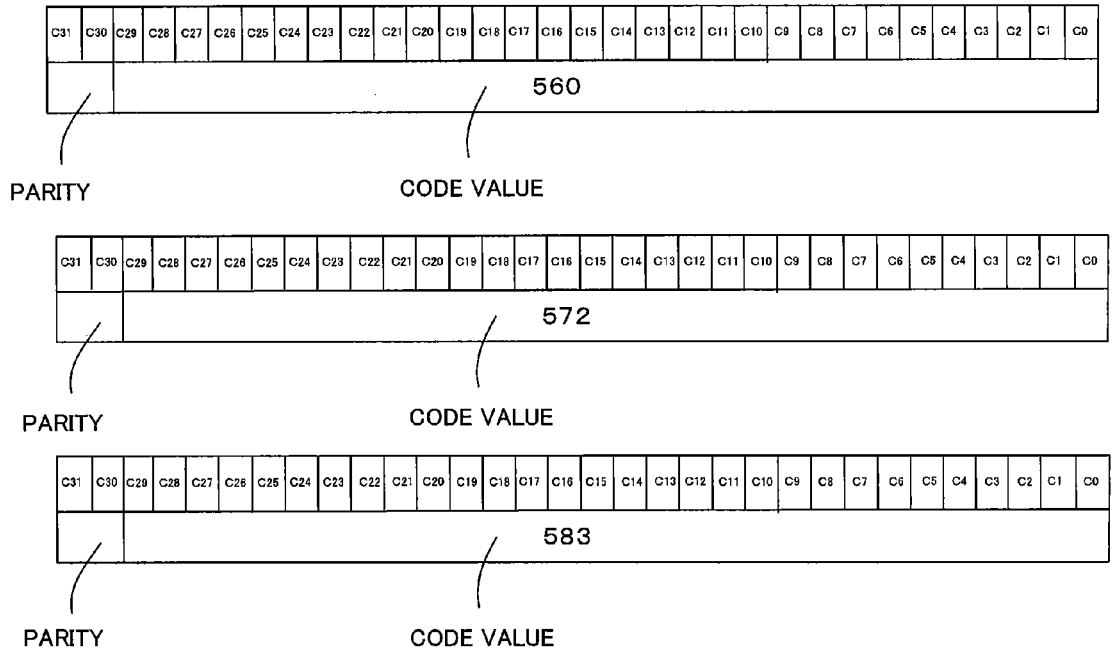

FIG. 20 A

| LINK TABLE ||
|---|---|
| CODE VALUE | FILE NAME (OR ADDRESS) |
| 560 | B-2 |
| 572 | B-3 |
| 583 | B-1 |
|  |  |

| CONTENT FILE |||
|---|---|---|
| FILE NAME (OR ADDRESS) | CONTENT FILE NAME (PREVIOUS) / CONTENT FILE NAME (NEXT) | CONTENT DATA |
| B-1 | — | Good morning. |
|  | B-2 |  |
| B-2 | B-1 | How are you ? |
|  | B-3 |  |
| B-3 | B-2 | I'm fine. Thank you. |
|  | — |  |

FIG. 20B

| LINK TABLE ||
|---|---|
| CODE VALUE | FILE NAME (OR ADDRESS) |
| 560 | B-2 |
| 572 | B-3 |
| 583 | B-1 |
|  |  |

| CONTENT FILE |||
|---|---|---|
| FILE NAME (OR ADDRESS) | CONTENT FILE NAME (PREVIOUS) / CONTENT FILE NAME (NEXT) | CONTENT DATA |
| B-1 | — | Good morning. |
|  | ② |  |
| B-2 | ① | How are you ? |
|  | ③ |  |
| B-3 | ② | I'm fine. Thank you. |
|  | — |  |

| INDEX TABLE ||
|---|---|
| INDEX | FILE NAME (OR ADDRESS) |
| ① | B-1 |
| ② | B-2 |
| ③ | B-3 |
|  |  |

FIG. 21A

<CONTINUOUS OUTPUT RANGE 200-203>

| \multicolumn{2}{c|}{LINK TABLE} |
|---|---|
| CODE VALUE | FILE NAME (OR ADDRESS) |
| ... | ... |
| 200 | B-1 |
| 201 | B-2 |
| 202 | B-3 |
| 203 | B-4 |
| ... | ... |

| \multicolumn{2}{c|}{CONTENT FILE} |
|---|---|
| FILE NAME (OR ADDRESS) | CONTENT DATA |
| ... | ... ... |
| B-1 | Good morning. (SOUND CONTENT) |
| B-2 | How are you ? (SOUND CONTENT) |
| B-3 | I'm fine. Thank you. (SOUND CONTENT) |
| B-4 | And you ? (SOUND CONTENT) |
| ... | ... ... |

FIG. 22
| LINK TABLE ||
|---|---|
| CODE VALUE | FILE NAME (OR ADDRESS) |
| ... | ..... |
| 556 | C-1 |
| 557 | A-3 |
| 558 | A-6 |
| 559 | A-4 |
| 560 | A-1 |
| 561 | B-3 |
| CONTENT FILE ||
|---|---|
| FILE NAME (OR ADDRESS) | CONTENT DATA |
| ... | ...... ... |
| A-1 | How are you ? (SOUND CONTENT) |
| A-2 | Http://www. ********** .co.jp/ |
| A-3 | INCREASE SOUND VOLUME |
| A-4 | DECREASE SOUND VOLUME |
| A-5 | I'm fine. Thank you. (SOUND CONTENT) |
| A-6 | MOTION PICTURE CONTENT |
| 564 | A-2 |
|---|---|
| 572 | A-5 |
| 573 | B-1 |
| B-1 | TEXT CONTENT |
|---|---|
| B-2 | And you ? (SOUND CONTENT) |
| B-3 | Http://www. ********** .co.jp/ |
| 583 | B-2 |
|---|---|
| ... | ..... |
| C-1 | Good morning. (SOUND CONTENT) |
|---|---|
| ... | ......... |

FIG. 23 A

| CONTENT FILE ||
|---|---|
| FILE NAME (ADDRESS) | CONTENT DATA |
| ... | ......... |
| A-1 | Good morning. |
| A-2 | How are you ? |
| A-3 | I'm fine. Thank you. |
| A-4 | And you ? |
| ... | ......... |

| LINK TABLE ||
|---|---|
| CODE VALUE | FILE NAME (ADDRESS) |
| ... | ... |
| 556 | (REGISTERING SPACE) |
| 560 | (REGISTERING SPACE) |
| 572 | (REGISTERING SPACE) |
| 580 | (REGISTERING SPACE) |
| ... | ... |

| LINK TABLE ||
|---|---|
| CODE VALUE | FILE NAME (ADDRESS) |
| ... | ... |
| 556 | A-1 |
| 560 | A-2 |
| 572 | A-3 |
| 580 | A-4 |
| ... | ... |

FIG. 23B

| CONTENT FILE ||
|---|---|
| FILE NAME (ADDRESS) | CONTENT DATA |
| ... | ......... |
| A-1 | Good morning. |
| A-2 | How are you ? |
| A-3 | I'm fine. Thank you. |
| A-4 | And you ? |
| ... | ......... |

| LINK TABLE ||
|---|---|
| CODE VALUE | FILE NAME (ADDRESS) |
| ... | ... |
| 556 | A-1 |
| 560 | A-2 |
| 572 | A-3 |
| ... | ... |

| LINK TABLE ||
|---|---|
| CODE VALUE | FILE NAME (ADDRESS) |
| ... | ... |
| 556 | A-1 |
| 560 | A-2 |
| 572 | A-3 |
| 572 | A-4 |
| ... | ... |

FIG. 27 A
| LINK TABLE | |
|---|---|
| COORDINATE VALUE | FILE NAME (OR ADDRESS) |
| ... ... | ... ... ... |
| $X_1, Y_1$ | B-1 |
| $X_2, Y_2$ | B-2 |
| $X_3, Y_3$ | B-3 |
| $X_4, Y_4$ | B-4 |
| ... ... | ... ... ... |
FIG. 27 B
| LINK TABLE | | | | |
|---|---|---|---|---|
| X AND Y COORDINATE VALUE RANGE | | | | FILE NAME (OR ADDRESS) |
| ... | ... | ... | ... | ... ... |
| $X_1,$ | $Y_1$ | $X_2,$ | $Y_2$ | B-1 |
| $X_3,$ | $Y_3$ | $X_4,$ | $Y_4,$ | B-2 |
| $X_5$ | $Y_5$ | $X_6$ | $Y_6$ | B-3 |
| $X_7$ | $Y_7$ | $X_8$ | $Y_8$ | B-4 |
| ... | ... | ... | ... | ... ... |
FIG. 27 C
| CONTENT FILE | |
|---|---|
| FILE NAME (OR ADDRESS) | CONTENT DATA |
| B-1 | Good morning. |
| B-2 | How are you? |
| B-3 | I'm fine. Thank you. |
| B-4 | And you? |
| ... | ... ... ... ... |
FIG. 27 D
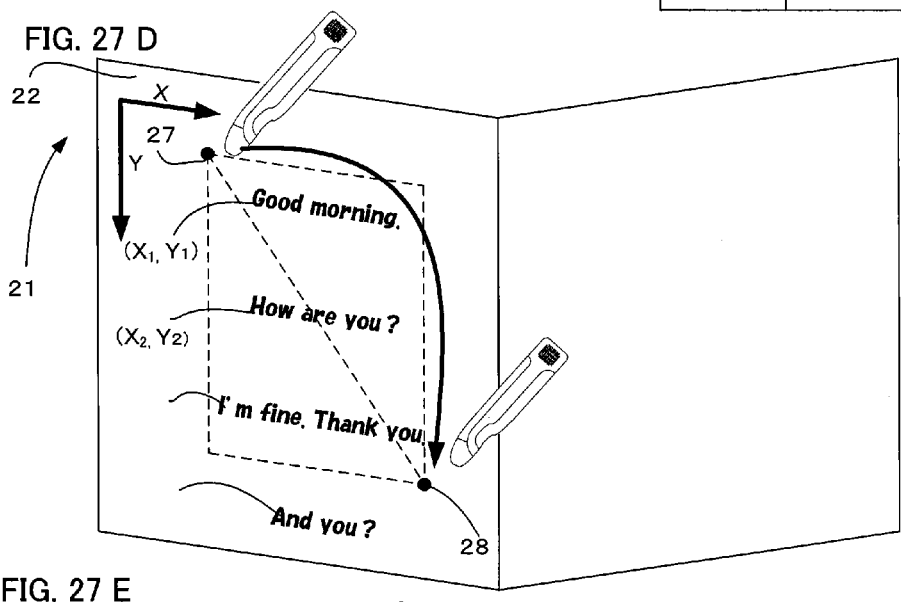
FIG. 27 E
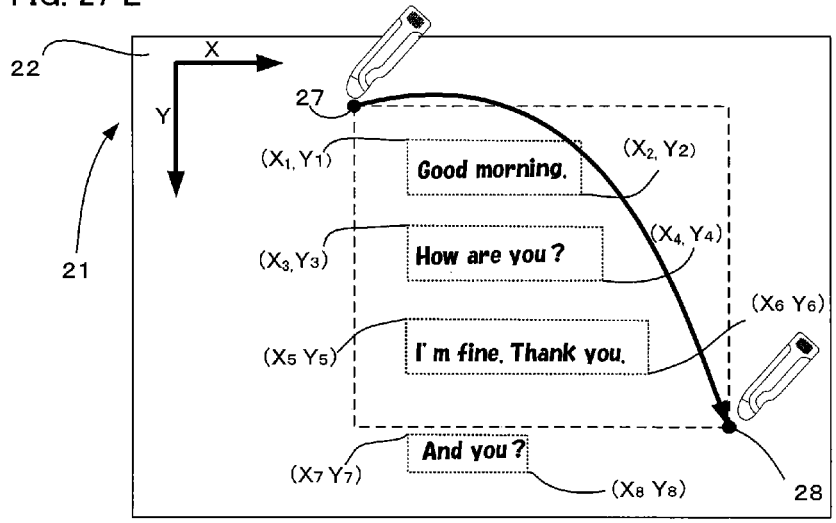

INFORMATION INPUT/OUTPUT APPARATUS, INFORMATION PROCESSING APPARATUS, INFORMATION INPUT/OUTPUT SYSTEM, PRINTING MEDIUM, AND INFORMATION INPUT/OUTPUT METHOD

CROSS REFERENCE TO RELATED APPLICATIONS

The present application is a U.S. national stage application under 35 U.S.C. §371 of International Patent Application No. PCT/JP2010/065118, filed Sep. 3, 2010, which claims priority to JP 2009-205058 filed on Sep. 4, 2009 and to JP 2010-159109 filed on Jul. 13, 2010, the entireties of which are incorporated by reference herein.

FIELD OF THE INVENTION

The present invention relates to a technique in which content data is continuously output by reading a printed medium on which a dot pattern is superimposed and printed with a text, a figure, a symbol and/or a photograph/illustration.

BACKGROUND OF THE INVENTION

Conventionally, an information input/output method for reading a barcode printed on a printed material and the like and outputting information such as a sound, an image, and a motion picture is proposed. For example, there has been proposed a method for storing information that matches with key information that is given in advance in the storage unit and outputting information and the like by searching from a key read out by a barcode reader. Also, there has been proposed a method for generating a dot pattern in which fine dots are arranged according to a predetermined rule in order to output a lot of information and programs, retrieving the dot pattern printed on a printed material and the like as image data using a camera, analyzing the dot pattern and converting the dot pattern into a dot code, and outputting content data such as a sound registered by being associated with the dot code in a link table. (WO2004/084125, WO2004/029871)

SUMMARY OF THE INVENTION

Problems that the Invention is to Solve

However, there is a problem that, if the link table associates and registers only one dot code signified by a dot pattern and one piece of content data, even if a user reads the dot pattern, only the one corresponding content is output and reproduced from the content data, and other successive content data cannot be continuously output.

Means to Solve the Problems

Thus, in consideration of this point, the inventor of this application devised the present invention of an information input/output method, information input/output device, information processing device, information input/output system and a printed medium with a dot pattern formed thereon, which enables continuous output of content data extremely easily.

The information input/output device of the invention comprises: an optical reading unit for reading a dot pattern formed on a medium surface; a processing unit for analyzing the dot pattern from image data of the dot pattern read out by the optical reading unit and converting the dot pattern into a dot code that defines a code value and/or a coordinate value; a storage unit for storing content data and a link table that associates, and registers the dot code that defines the code value and/or coordinate value and the content data; an output unit for reading the content data associated with the dot code that is converted by the processing unit from the storage unit and outputting the content data; and a control unit for controlling operation of the optical reading unit, the processing unit, and the output unit, wherein the link table stored in the storage unit associates and registers at least two pieces of content data and the dot code, the control unit instructs to refer to the link table using the dot code and continuously output the at least two pieces of content data, and the output unit reads out the at least two pieces of content data associated with the dot code from the storage unit and continuously outputs the content data according to the instruction.

According to the above configuration, as the link table associates and registers a dot code and at least two pieces of content data, only by reading and analyzing the one dot pattern and converting the dot pattern into the dot code, content data associated and registered with the dot code can be continuously output.

In the information input/output device of the invention, the processing unit may analyze the dot pattern and convert the dot pattern into a dot code that defines a code value and/or a coordinate value for indicating association with at least one piece of other content data in addition to a code value and/or a coordinate value for indicating association with predetermined content data that is output first, and the control unit may instruct to refer to the link table using the two or more code values and/or coordinate values defined by the dot code and continuously output the predetermined content data that is output first and the at least one piece of other content data.

However, when content data is continuously output according to the above configuration, as it is not necessary to register a dot code by associating with two or more pieces of content data in a link table stored in the storage unit, the dot code may be registered by associating with one piece of content data.

According to the above configuration, as the dot code has a function as instruction information indicating other content data to be output after outputting desired content data, there is an advantage in which, in order for a user to start outputting continuous content data, the user may perform only reading of one dot pattern associated with one piece of the continuous content data, it is not necessary to perform operation of reading different dot patterns one after another.

Also, the dot code is instruction information indicating a code value of other content data to be output after outputting predetermined content data, as the dot code has a code value and/or a coordinate value indicating other content data (for example, content data to be output after presently outputting content data, or content data that has been already output therebefore) in addition to a code value and/or a coordinate value associated, in the link table, with content data to be output by reading a dot pattern formed on a respective printed region. This provides further advantage in which, as the instruction information simply specifies only a code value and/or a coordinate value registered by associating with content data to be continuously output next, only by changing association between the code value and the content data in the link table, the order of the content data to be continuously output can be freely changed.

In addition, as the dot code defines a code value and/or a coordinate value of content data before or after the presently outputting content data, when a user does not want to start outputting from the first content data (for example, the content up to the third chapter of a novel has already been listened and the content from the fourth chapter is desired to be listened), even if the content data is started being output from the middle, the content data can be continuously output by reading a dot code formed and defined at the beginning part of the fourth chapter. Further, by changing a playback mode of the content data, the content data can be easily reproduced in a reverse order.

It should be noted that, as the dot code is registered to be associated with content data in a link table, the dot code may be a code value and/or a coordinate value unique to each different printed area, or may be a code value and/or a coordinate value unique to a range by dividing the printed area to some ranges.

It should be noted that content data here includes an execution instruction and the like of recorded sounds, imaged and recorded motion pictures, URLs of WEB sites, right click/left click, increase and decrease of a sound volume, and instructions and orders to another device by infrared communication.

Also, it is preferable that the processing unit of the information input/output device of the invention analyzes the dot pattern indicated by a difference value from a code value and/or a coordinate value for indicating association with the predetermined content data that is output first, and converts the dot pattern into a dot code that defines a code value and/or a coordinate value for indicating association with at least one piece of other content data in addition to a code value and/or a coordinate value for indicating association with the predetermined content data that is output first.

As described above, when a code value or a coordinate value for indicating association with predetermined content data that is output first and a code value or a coordinate value for indicating association with other content data are defined by one dot code, by expressing the code value or coordinate value for indicating association with the other content data using a difference value from the code value or coordinate value for indication association with the predetermined content data that is output first, the dot code can be instruction information indicating a code value of the other content data to be output after outputting the predetermined content data, saving the information amount contained in one dot code.

As the dot code defines instruction information that indicates a code value of other content data to be output after outputting predetermined content data to save information amount, for example, the range of code value to be used can be increased or the dot code can define advanced security or X and Y coordinate values.

In the information input/output device of the invention, the storage unit may store a dot code linking table that associates and registers dot codes with at least one association, and the control unit may instruct to refer to the link table using the predetermined dot code converted by the processing unit and output content data registered in the link table by being associated with the predetermined dot code, as well as may instruct to refer to the dot code linking table and continuously output content data registered in the link table by being associated with the other dot code that is associated and registered with the predetermined dot code in the dot code linking table.

As described above, by storing a dot code linking table in the storage unit and registering the dot codes therein by associating the dot codes one another, the control unit can output the following content data after outputting desired content data by referring to the dot code linking table and the link table. Also, as the linkage of dot codes can be confirmed by referring to the dot code-linking table, content data to be continuously output can be read and output without being limited to the information amount contained in one dot code.

It should be noted that when continuously outputting content data in the above configuration, as it is not necessary to associate and register a dot code and two or more pieces of content data in the link table stored in the storage unit, the dot code, of course, may be associated and registered with one piece of content data.

Also, in the invention, content data may be continuously output at least once in the ascending order or descending order of dot codes using a dot code-linking table that stores the dot codes respectively associated with the content data according to the continuously outputting order.

The storage unit may store code values that are defined by dot codes respectively associated with content data in the ascending order or descending order, and the content data may be continuously output at least once according to the order.

Also, in the invention, the range of dot codes for continuous output may be specified at least one and the content data may be continuously output at least in the ascending order or descending order of only the dot codes that are associated with content data of sounds and/or motion pictures within the range. It will be appreciated that corresponding content is continuously output in the ascending order or descending order by reading any dot code within the range.

As described above, if content data is continuously output in the ascending order or descending order of only the dot codes associated with content data of sounds and/or motion pictures, only the content data of sounds may be connected and continuously output or only the content data of motion pictures may be connected and continuously output without outputting content data such as an execution instruction that is not required to be continuously output (for example, an instruction of converting the sound from Japanese to English).

The link table stored in the storage unit of the information input/output device of the invention associates and registers content data to be continuously output and dot codes of an ascending order or a descending order, the storage unit further stores a continuous output range of content data associated with the dot codes and to be continuously output, and the control unit refers to the continuous output range using a dot code converted by the processing unit, and, if the dot code is within the continuous output range, instructs to refer to the link table, output, first, the content data that is registered in the link table by being associated with the dot code, then, continuously output the content data that is registered in the link table by being associated with dot codes of an ascending order or a descending order within the continuous output range.

According to the above configuration, after reading a dot pattern and converting the dot pattern into a dot code and outputting the content data registered by being associated with the dot code, dot codes may be referred to in the ascending order or descending order in which the dot codes are listed and registered in the link table, and content data associated with the dot codes may be continuously output, making control performed by the control unit easy. Further, the range of continuously outputting content data can be determined in advance depending on the content and the like of the content data.

In the information input/output device of the invention, the storage unit may store content data by recording the content data and a file name in a content file, the content file may store a file name for indicating at least one other content file as well as the file name that is unique to the content file, and the control unit may instruct to refer to the link table using the dot code converted by the processing unit and output content data that is registered in the link table by being associated with the dot code, as well as instruct to refer to a file name for indicating another content file stored in the content file and continuously output data of a content stored in the another content file.

According to the above configuration, to continuously output content data, instruction information indicating the location of the content information to be output after outputting desired content data may be obtained by reading a content file name stored in a content file regardless of a code value and X and Y coordinate values defined by a dot code.

It should be noted that even when continuously outputting content data by the above configuration, the dot code may be associated and registered with one piece of content data in a link table stored in the storage unit.

It is preferable that the information input/output device of the invention further comprises: a start point detecting unit that firstly detects a start point when an optical reading unit reads a dot pattern that defines a dot code; and an end point detecting unit that secondly detects an end point when the optical reading unit reads the dot pattern that defines the dot code, wherein the control unit instructs to continuously output only the content data stored in the storage unit by being associated with the dot code from the start point to the end point, and the output unit outputs the content data according to the instruction.

Also, the dot code may define at least X and Y coordinate values, the control unit may instruct to continuously output only the content information that is stored in the storage unit by being associated with a code value and/or X and Y coordinate values signified by a dot code defined by a dot pattern included in a predetermined rectangular area having a diagonal line connecting the start point and the end point detected by the start point detecting unit and the end point detecting unit, and the output unit may output the content data according to the instruction.

According to the above configuration, a user can define the range of content data that is desired to be output, that is, the start point and the end point of the content data to be continuously output.

The information processing device of the invention is characterized by comprising: a receiving unit that receives a dot code from an information input device that comprises an optical reading unit that reads a dot pattern formed on a medium surface, a processing unit that analyzes the dot pattern from image data of the dot pattern read out by the optical reading unit and converts the dot pattern into a dot code that defines a code value and/or a coordinate value, and a transmitting unit that transmits the dot code to the information processing device; a storage unit that stores content data and a link table that associates and registers the dot code that defines a code value and/or a coordinate value and the content data; an output unit that reads out the content data that is associated with the dot code converted by the processing unit from the storage unit and outputs the content data; and a control unit that controls operation of the optical reading unit, the processing unit, the transmitting unit, the receiving unit, and the output unit, wherein the link table stored in the storage unit associates and registers at least two pieces of content data and the dot code, the control unit instructs to refer to the link table using the dot code and continuously output the at least two pieces of content data, and the output unit reads out the at least two content data associated with the dot code from the storage unit and continuously outputs according to the instruction.

As in the above described configuration, even if the information processing device (a personal computer or the like) itself does not comprise an optical reading unit or a processing unit that processes image data of dot patterns, continuous output of content data using the dot pattern can be realized by wiredly or wirelessly connecting an information input device having such functions (a scanner, a camera, and the like).

Also, even if the information input device (a scanner, a camera, and the like) does not comprise a processing unit, yet, only comprises means for imaging a dot pattern and transmitting the image data to an information processing device (a personal computer and the like), as long as the information processing device has means for receiving image data transmitted from the information input device, analyzing the image data, and converting into a dot code that defines a code value and/or a coordinate value, content data can be continuously output as in the above described configuration.

Further, the problem of the invention can also be solved by the information input/output system that comprises an information input device comprising the optical reading unit, the processing unit, and the transmitting unit, and the information processing device comprising the receiving unit, the storage unit, the output unit, and the control unit, wherein the link table stored in the storage unit of the information processing device associates and registers at least two pieces of content data and the dot code,
the control unit of the information processing device instructs to refer to the link table using the dot code and continuously output the at least two pieces of content data, and the output unit of the information processing device reads out the at least two pieces of content data associated with the dot code from the storage unit and continuously outputs the content data according to the instruction.

As described above, in the information processing device and the information processing system of the invention, the processing unit may analyze the dot pattern and convert the dot pattern into a dot code that defines a code value and/or a coordinate value for indicating association with at least one other content data in addition to a code value and/or a coordinate value for indicating association with predetermined content data that is output first, and the control unit may instruct to refer to the link table using the two or more code value and/or coordinate values that are defined by the dot code and continuously output the predetermined content data that is output first and the at least one other content data, and, whereby, the output unit may continuously output the content data at least twice according to the instruction. Also, the storage unit may store the dot code-linking table, and content data may be continuously output based on the dot code-linking table. Also, the storage unit may store the content data by recording the content data with the file name in a content file, and the content file may store a file name indicating at least one other content file in addition to the file name unique to the content file, and the content data can be continuously output based on these. It should be noted that, when continuously outputting content data in such a configuration, the dot code may be registered in the link table stored in the storage unit by being associated with one piece of content data. Further, the information input device may comprise the start point detecting unit and the end point detecting unit, and the start point information and the end point information detected by the start point detecting unit and the end point detecting unit may be transmitted to the information processing device, whereby the range of content data to be continuously output can be arbitrary specified by a user.

In the printed medium of the invention, a dot pattern that arranges dots based on a predetermined rule and defines a code value and/or a coordinate value is superimposed and printed with a text, a figure, a symbol and/or a photograph (a text, etc.), the printed medium is used for outputting content data that is associated with a dot code signified by the dot pattern and stored in a storage unit of an information input/output device from an output unit of the information input/output device when an optical reading unit of the information input/output device reads the dot pattern, wherein: the printed medium has a printed area printed with the text, etc.; the printed area is superimposed and printed with a dot pattern respectively signifying a different dot code; when the dot pattern is analyzed by a processing unit of the information input/output device, the dot pattern is converted into a dot code that defines a code value and/or a coordinate value; the dot code is registered in a link table stored in the storage unit of the information processing device by being associated with at least two pieces of content data; a control unit of the information processing device instructs to refer to the link table using the dot code and continuously output the at least two pieces of content data; and an output unit of the information processing unit reads out the at least two pieces of content data associated with the dot code from the storage unit and continuously outputs the content data.

Also, it is preferable that the dot pattern of the printed medium is superimposed and printed with a text, etc., by: continuously arranging a plurality of reference dots in a line in accordance with a predetermined rule on a printed medium; providing a first virtual reference line comprising a straight line, a polygonal line and/or a curved line that connects the plurality of reference dots; providing a second virtual reference line comprising a straight line, a polygonal line and/or a curved line that is defined at a predetermined position from the reference dots and/or the first virtual reference line; providing a plurality of virtual reference points at predetermined positions on the second virtual reference line; and arranging an information dot the defines information by a distance and a direction from the virtual reference point at the end point of a vector expressed with the virtual reference point as the start point.

According to the above configuration, regardless of the shape of the rectangular area in the conventional dot pattern, the dot pattern can be formed on a medium surface along a line including a curved line and a character string of a text in the printed area. Also, by continuously forming a band of the dot pattern in a clockwise direction, the dot pattern can be formed by superimposing and printing on a text, etc. laid out on a printed medium of any curved surface including a globe, a model of human body and the like, and a variety of products.

Further, for the dot pattern, a plurality of reference dots continuously arranged in lines according to the predetermined rule may be arranged over at least two lines on the medium surface, more than two first virtual reference lines that connect the plurality of reference dots and comprise straight lines, polygonal lines and/or curved lines may be provided corresponding to the reference dots of more than two lines, and a second virtual reference line that is defined at a predetermined position from the reference dots and/or the virtual reference lines may be defined between the two or more first virtual reference lines.

According to the above configuration, as the second virtual reference line can be defined by the first virtual reference lines, the positions of the virtual reference point and information dot can be obtained more correctly and the recognition rate of the dot pattern can be improved.

Also, it is preferable that the printed medium of the invention is a side reader of a main reader, the printed medium is superimposed and printed with a text, etc. and/or an iconized text, etc. and the dot pattern corresponding to a content of at least one predetermined position of the main reader as an index of the main reader printed with a text, etc., and content information that corresponds to the content of the predetermined position of the main reader and is associated with a dot code signified by the dot pattern and stored in a storage unit of an information processing device, is output from an output unit of the information processing device by reading the dot pattern using an optical reading unit of the information processing device.

According to the above configuration, for example, even if it is difficult to form a dot pattern directly on a main reader, such as a novel and a picture book, content data corresponding to the content of the main reader can be output using a dot pattern and these content data can be easily continuously output without forming the dot pattern on the main reader by preparing an index, such as a table of content and items, in a side reader thereof and forming a dot pattern superimposed on this index.

It should be noted that the main reader refers to a variety of printed mediums, such as a novel, a picture book, a magazine, a text book, a dictionary, a bible, and a photo book, and the side reader refers to a printed medium that has a use purpose of accompanying the main reader, such as a booklet, a card, a bookmark, a sticker, a foldable printed medium. Also, the side reader can be attached as an appendix of the main reader by making the side reader the shape and size that can be slipped in the main reader or enclosed with the main reader.

The side reader is preferably a booklet, a card, a sticker, or a foldable printed medium.

The printed medium of the invention or the printed medium as a side reader as described above can be used when the processing unit analyzes a dot pattern and converts the dot pattern into a dot code that defines a code value and/or a coordinate value for indicating association with at least one other content data, in addition to a code value and/or a coordinate value for indicating association with predetermined content data that is output first, the control unit instructs to refer to the link table using the two or more code values and/or coordinate values that are defined by the dot code and continuously output predetermined content data that is output first and the at least one other content data, and the output unit continuously outputs the content data at least twice according to the instruction. Also, the storage unit may further store the dot code-linking table, and content data can be continuously output based on the dot code-linking table. Also, the printed medium can also be used when the storage unit stores content data by recording the content data and the file name in a content file, the content file store a file name that indicates at least one other content file in addition to a file name unique to the content file, and the content data is continuously output based on these. It should be noted that when continuously outputting content data by such a configuration, the dot code may be registered in the link table stored in the storage unit by being associated with one piece of content data. Further, the printed medium can also be used when the information input device comprises the start point detecting unit and the end point detecting unit, transmits the start point information and the end point information detected by the start point detecting unit and the end point detecting unit to an information processing device, and a user arbitrary specifies the range of content data to be continuously output.

The information input/output method of the invention comprises the steps of: reading a dot pattern formed on a medium surface by an optical reading unit; by a processing unit, analyzing the dot pattern from image data of the dot pattern read out by the optical reading unit, and converting the dot pattern into a dot code that defines a code value and/or a coordinate value; and by an output unit, reading and outputting content data that is associated with the dot code converted by the processing unit and registered in a link table of a storage unit from the storage unit, wherein the link table stored in the storage unit associates and registers at least two pieces of content data and the dot code, and the information input/output method further comprises the steps of, by a control unit, instructing to refer to the link table using the dot code and continuously outputting the two or more pieces of content data, and, by the output unit, reading out the two or more pieces of content data from the storage unit and continuously outputting the content data according to the instruction.

The information input/output method of the invention as described above may further comprises a step of: by the processing unit, analyzing a dot pattern and converting the dot pattern into a dot code that defines a code value and/or a coordinate value for indicating association with at least one other content data, in addition to a code value and/or a coordinate value for indicating association with predetermined content data that is output first; by the control unit, instructing to refer to the link table using the two or more code values and/or coordinate values that are defined by the dot code and continuously output predetermined content data that is output first and the at least one other content data; and, by the output unit, continuously outputting the content data at least twice according to the instruction Also, the storage unit may further store the dot code linking table, and content data can be continuously output based on the dot code linking table. Also, the storage unit may store content data by recording the content data and the file name in a content file, and the content file may store a file name that indicates at least one other content file in addition to a file name unique to the content file, whereby the content data may be continuously output based on these. It should be noted that when continuously outputting content data by such a configuration, the dot code may be registered in the link table stored in the storage unit by being associated with one piece of content data. Further, a user can arbitrary specify the range of content data to be continuously output by further comprising the steps of: firstly, by the start point detecting unit, detecting a start point in the dot pattern read out by the optical reading unit; secondly, detecting an end point in the dot pattern read out by the optical reading unit; and transmitting the start point information and the end point information detected by the start point detecting unit and the end point detecting unit to an information processing device.

The dot pattern may be formed by arranging a plurality of stream dot patterns that are arrayed in accordance with the steps of: continuously arranging a plurality of reference dots in a line according to a predetermined rule; providing a first virtual reference line that comprises a straight line, a polygonal line and/or a curved line that connects the plurality of reference dots; providing at least one second virtual line that is defined at a predetermined position from the reference dots and/or the first virtual reference line and comprises a straight line, a polygonal line and/or a curved line; providing a plurality of virtual reference points at predetermined positions on the second virtual reference line; and arranging an information dot that defines X and Y coordinate values and/or a code value by a distance and a direction from the virtual reference points at the end point of a vector expressed with the virtual reference point as the start point.

According to this, by arranging and forming a plurality of stream dot patterns having reference points with even intervals, X and Y coordinate values are defined on a medium surface without a gap. Further, when letters, staff notion, maps, figures are printed on a medium surface and operation is performed by tracing or touching on the line segment thereof using a scanner pen, the dot pattern can be reasonably arranged by forming a dot pattern along the line segment. Also, without being limited to the shape of a rectangular area when forming a dot pattern that defines X and Y coordinates as two-dimensional code (using as an index), a dot pattern in which a set of certain information is repeated in a free shape tailored to the information area visually formed on a medium surface.

The stream dot may further provide a reference dot as reference at a predetermined position in order to define the second virtual reference line and/or the direction of the dot pattern and one X and Y coordinate value and/or code value.

According to this, by providing a new reference point, the direction of a stream dot pattern and set of certain information can be defined easily without using an information dot, suppressing too much information decrease. Further, by providing a new reference point, the position of a virtual reference point as the start point of the information dot can be correctly indicated.

BRIEF DESCRIPTION OF THE DRAWINGS

FIGS. 7A to 7D are explanatory diagrams showing variants of the dot pattern.

FIGS. 9A to 9C are explanatory diagrams showing a relationship among a dot pattern, a code value, and an identifier.

FIGS. 14A to 14C show variants of dot pattern. FIG. 14A is an example in which 12 information dots are arranged in an area. FIG. 14B is an example in which 16 information dots are arranged in an area. FIG. 14C is an example in which 24 information dots are arranged in an area.

FIGS. 17A to 17C are explanatory diagrams showing an example of a dot code, a link table, and a content file.

FIGS. 19A and 19B are explanatory diagrams showing an example of a dot code format.

FIGS. 20A and 20B are explanatory diagrams showing an example of link tables in which code values and content data are associated and registered.

FIG. 21A is an explanatory diagram showing an example of a link table in which code values and content data are associated and registered.

FIG. 22 is an explanatory diagram showing an example of a link table in which code values and content data are associated and registered.

FIGS. 23A and 23B are explanatory diagrams of linking between content data and dot codes (code values) by a linking unit.

FIGS. 27A to 27E are explanatory diagrams of a method for specifying a range of content data to be continuously output.

MODE FOR CARRYING OUT THE INVENTION

The following describes an example of an embodiment of the invention.

Figure 1A:
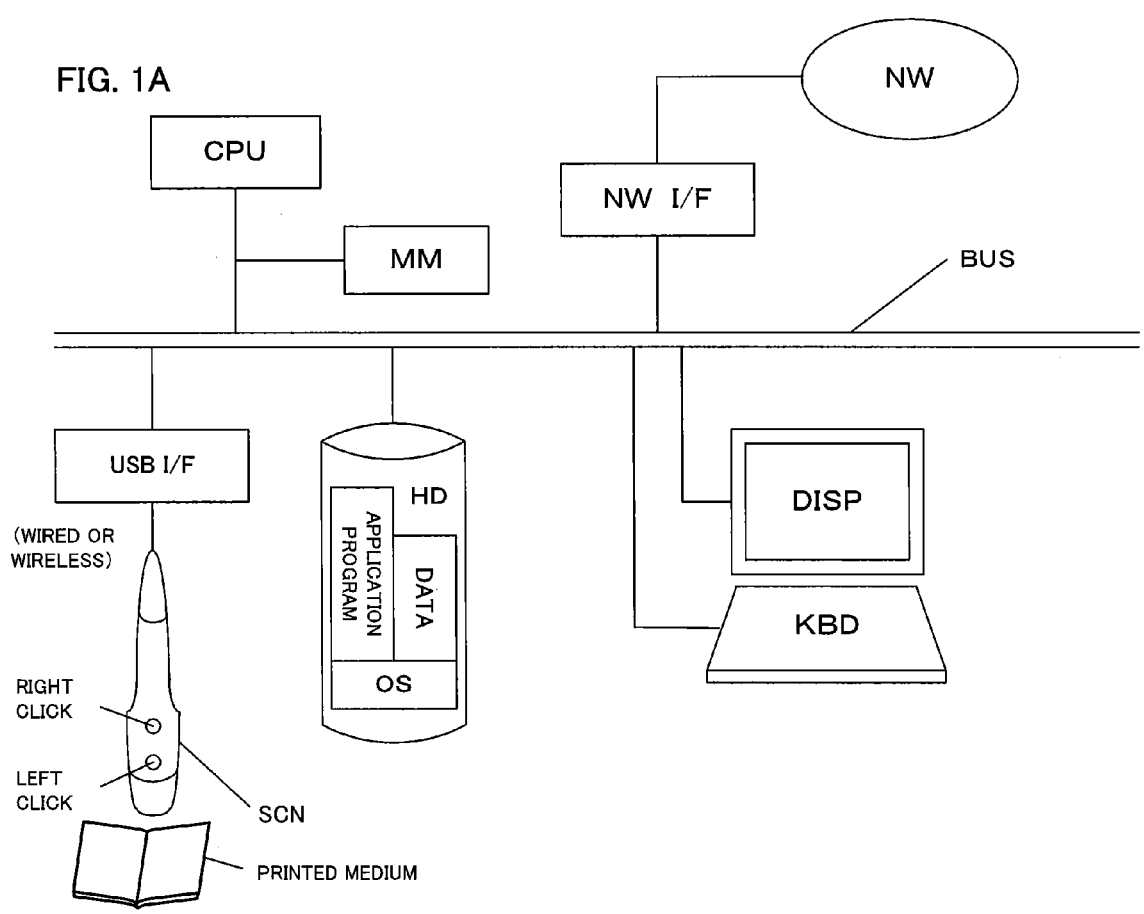
FIG. 1A is a hardware block diagram showing a configuration example of a personal computer and a scanner.

FIG. 1A is a hardware block diagram showing a configuration of a personal computer (information processing device) and a scanner (information input device).

As shown in FIG. 1A, the personal computer has, centering on a central processing unit (CPU), a main memory (MM), and a hard disk device (HD), a display device (DISP) as an output unit, and a keyboard (KBD) as an input unit, connected by a bus (BUS).

Then, a scanner (SCN) as an imaging unit is connected through a wired or wireless USB interface (USB I/F).

While the inner structure of this scanner (SCN) is not described, an infrared irradiation unit (LED), a filter for cutting off a predetermined wavelength element of the reflection light, and an imaging element for imaging (CCD and CMOS) are embedded, so that reflection light from a variety of printed mediums printed with a dot pattern, such as an ID tag as an medium, a paper keyboard, and a paper controller are imaged and the dot pattern printed on such medium surfaces can be processed as image data.

Also, this scanner (SCN) analyzes image data of a dot pattern and converts the dot pattern into a dot code that defines a code value and a coordinate value, and the converted dot code is transmitted to a central processing unit (CPU) through an USB interface (USB I/F).

It should be noted that, while the information amount transmitted to the central processing unit (CPU) increases, image data can be transmitted as is without being converted into a dot code and the processing unit of the central processing unit (CPU) can be used to analyze image data of the dot pattern and convert the image data into a dot code.

Then, a right click button and a left click button are provided on the side of the scanner (SCN) to realize the functions of the right click and left click of a mouse. It should be noted that, while, in FIG. 1A, in a state in which the reading portion faces down, the right click button is arranged at the upper part and the left click button is arranged at the lower part, the arrangement is not limited to this.

It should be noted that, while not shown in the drawings, a printer, a speaker, and the like may be connected in addition to the display device (DISP).

Also, the bus (BUS) is connected to a network (NW) such as the Internet through a network interface (NW I/F), and a variety of contents and programs, such as electronic map data, text information, image information, sound information, and motion picture information, can be downloaded from a server that is not drawn in the drawings. Further, authentication of scanners (SCN) and the like and users can also be performed.

The hard disk (HD) stores, in addition to an operation system (OS), data of a variety of contents including a variety of programs, such as a dot pattern analysis program, electronic map data, text information, image information, sound information, motion picture information, and the like, a variety of tables including link tables that associates contents, programs, processing instructions with read dot codes. Also, if the read dot code is not in the referred link table, contents, programs, and processing instructions may be downloaded by referring to a link table on a server through a network. It should be noted that the link table may be stored in a server without being stored in the information processing device.

When the central processing unit (CPU) receives an input signal of a code value or coordinate value converted from image data of a dot pattern on a medium surface read out by the scanner (SCN) through a USB interface, the central processing unit reads out a variety of content data including electronic map data, text information, image information, sound information, and motion picture information, and a program and the like that correspond to the input signal from a hard disk (HD) and outputs from a display device (DISP) or other output devices such as a speaker which is not shown in the drawings.

Here, the dot pattern on the printed medium surface is printed with a carbon ink and image and text portions other than the dot pattern is printed with a non-carbon ink.

As this carbon ink has a characteristic of absorbing infrared light, the image captured by the optical imaging element shows black only at a dot portion.

In this way, as only the dot pattern formed with fine dots (approximately 0.05 mm) is printed with a carbon ink, even though the carbon ink is black (carbon black), the dot pattern can be superimposed and printed on a normal print without visually affecting images and texts printed with other non-carbon ink (CMYK).

It should be noted that, while the carbon ink was taken as an example as ink having a characteristic of absorbing infrared light, printing of the dot pattern is not limited to a carbon ink as long as the ink reacts to a predetermined wavelength. If an invisible ink that absorbs infrared rays is used, the images and texts will not be visually affected at all.

The captured image of the dot pattern read out in this way is generally analyzed and converted to a coordinate value or a code value by the central processing unit (CPU) inside the scanner and transmitted to a personal computer through a USB cable and a USB interface (USB I/O). It should be noted that the USB interface (USB I/O) may be any other interface.

The central processing unit (CPU) of the personal computer refers to a table that indicates the received coordinate value or code value, and outputs content data, such as an electronic map data, text information, image information, sound information, and motion picture information, that corresponds to the coordinate value or code value from a display device (DISP) or a speaker which is not shown in the drawing.

Figure 1B:
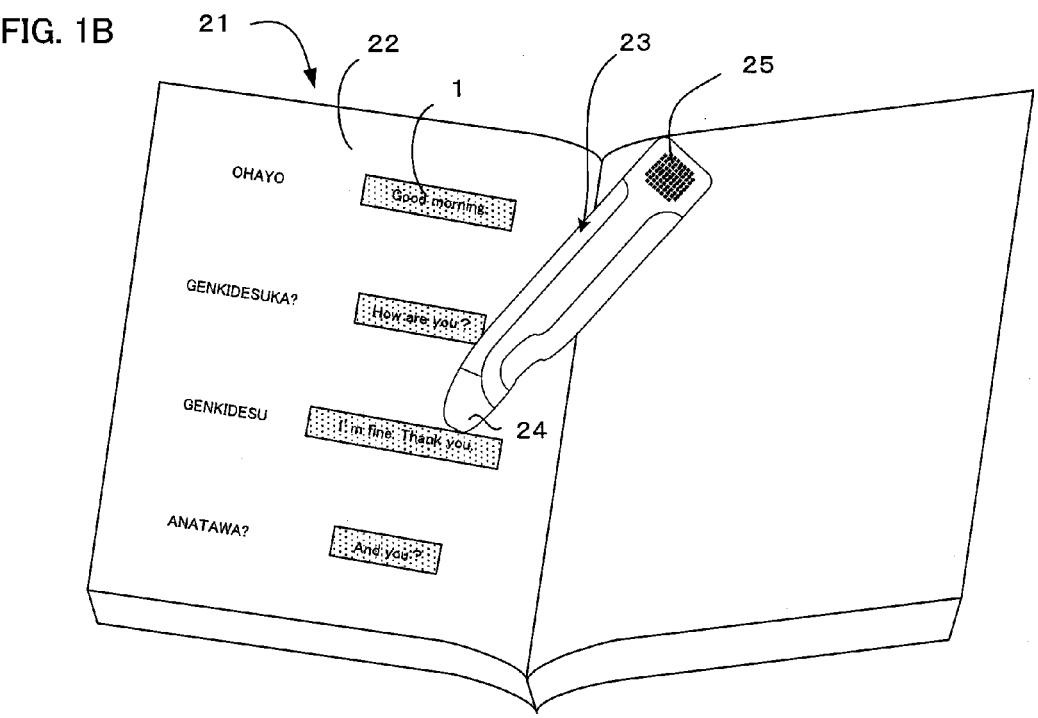
FIG. 1B is an explanatory diagram showing a state in which a printed area where a dot pattern is superimposed and printed with a text on a printed medium is imaged by the scanner.

FIG. 1B is a drawing in which a printed area 4 in which a dot pattern and a text are superimposed and printed on a printed medium 5 is imaged using a speaking pen (information input/output device 23).

In this way, an optical reading unit, a central processing unit (CPU), a hard disk device (HD), and an output unit may be equipped in the same hardware. It should be noted that the hard disk device (HD) may be any other storage device.

As shown in FIG. 1B, after retrieving a dot pattern formed on a printed medium such as a printed material as image data using a speaking pen with an optical reading device such as a camera, the dots that are formed according to a predetermined rule in the dot pattern may be recognized and digitized to output corresponding content data based on a numerical value (a dot code) of the decoded information dot.

<Description of Dot Pattern; Grid1>

The following describes the dot pattern used in the invention with reference to FIGS. 2 to 7D.

Figure 2:
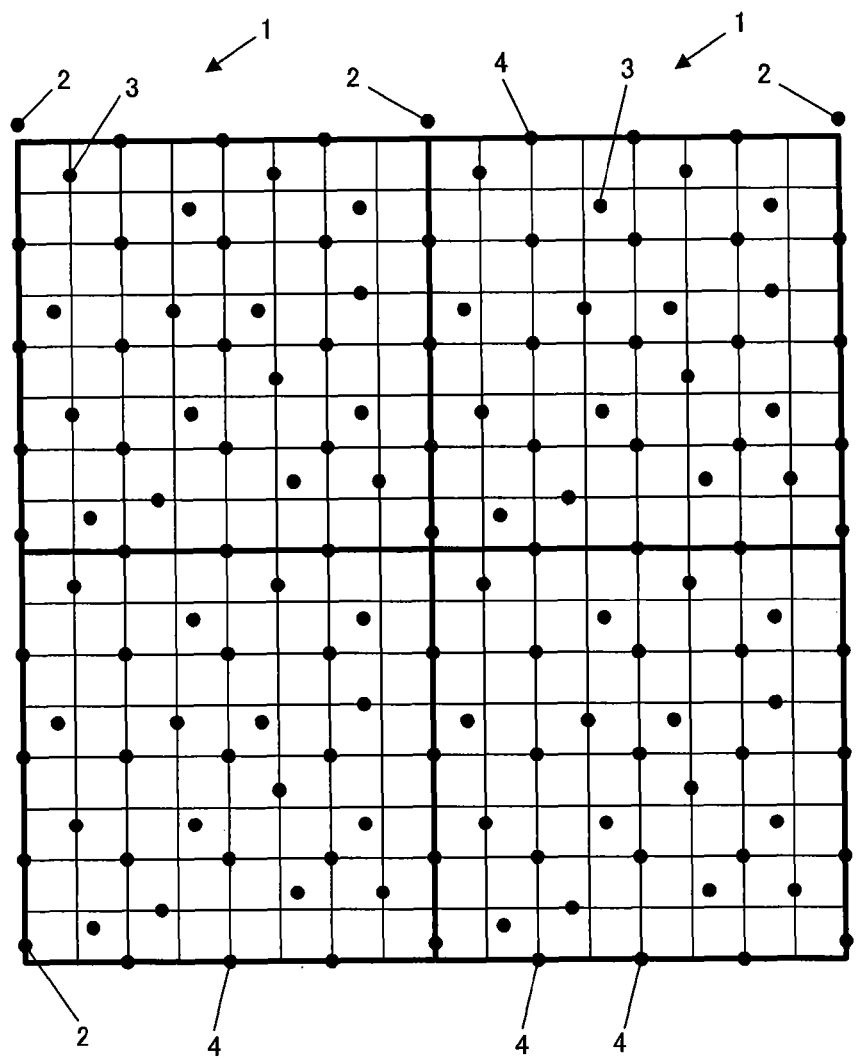
FIG. 2 is an explanatory diagram showing GRID1 as an example of a dot pattern.

FIG. 2 is an explanatory diagram showing GRID1 as an example of the dot pattern.

It should be noted that, in these drawings, the grid lines in vertical and horizontal directions are added for convenience of description and do not exist in the actual printed surface. When the scanner as an imaging unit has an infrared irradiation unit, key dots 2, information dots 3, reference grid point dots 4 and the like constituting the dot pattern 1 are preferably printed with a carbon ink that absorbs the infrared light.

Figure 3A:
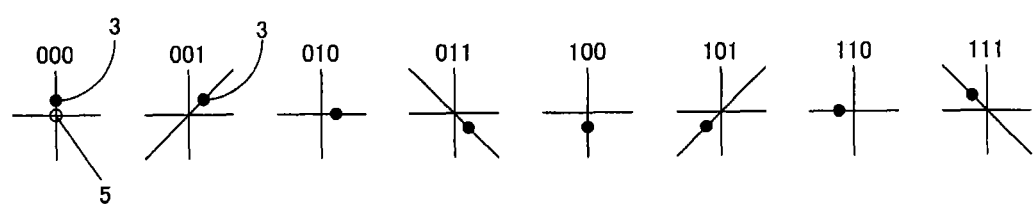
FIGS. 3A and 3B are explanatory diagrams showing an example of information dots of the dot pattern and bit expression of data defined therein.
Figure 3B:
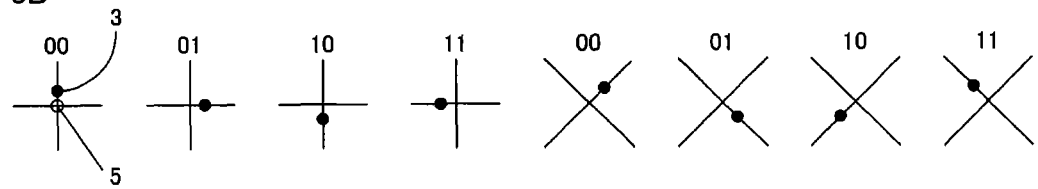
Figure 4A:
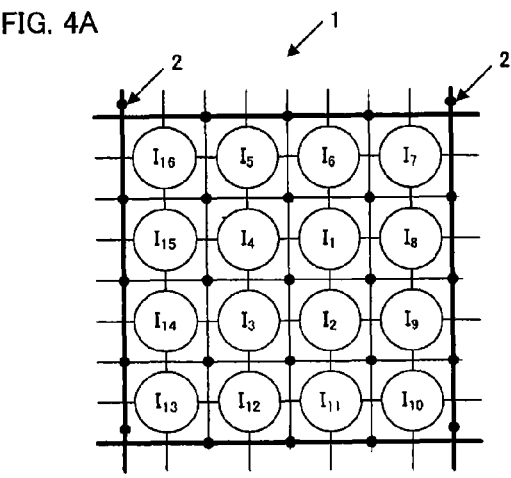
FIGS. 4A and 4B are explanatory diagrams showing information dots arranged in relation to key dots as centers.
Figure 4B:
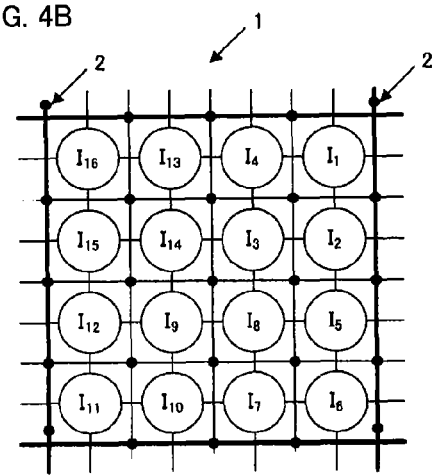

FIGS. 3A and 3B are enlarged views showing an example of information dots of a dot pattern and bit expression of data defined therein. FIGS. 4A and 4B are explanatory diagrams showing information dots arranged in relation to key dots as centers.

The method of inputting and outputting information using a dot pattern comprises: an unit for generating a dot pattern 1, an unit for recognizing the dot pattern 1, and an unit for outputting information and a program from this dot pattern 1.

That is, after retrieving the dot pattern 1 as image data by a camera, the reference grid point dots 4 are extracted first, then, key dots 2 are extracted based on the fact that there is no dot at a position where a reference grid point dot 4 is supposed to exist. Next, an information dot 3 is extracted and digitized to extract the information area and convert the information to a numerical value whereby the information and program is output from the dot pattern 1 based on the numerical information. For example, information such as a sound and a program is output from this dot pattern 1 to an information output device, a personal computer, a PDA, a mobile telephone, and the like.

The dot pattern 1 is generated by arranging, according to a dot code generation algorithm, fine dots, that is, key dots 2, information dots 3, and reference grid point dots 4 based on a predetermined rule, for recognition of information such as a sound.

As shown in FIG. 2, in a block of a dot pattern 1 that expresses information, 5×5 reference grid point dots 4 are arranged with reference to a key dot 2, and an information dot 3 is arranged around a virtual grid point 5 at a center surrounded by four reference grid point dots 4. Arbitrary numerical information is defined in this block. It will be appreciated that, while the illustration of FIG. 2 shows a state where four blocks of dot pattern 1 (in a bold frame) are arrayed, the dot pattern 1 is not limited to four blocks.

One corresponding information and program can be output for one block, or one corresponding information and program can be output for a plurality of blocks.

When retrieving this dot pattern 1 as image data by a camera, reference grid point dots 4 can calibrate distortion due to distortion of the lens of a camera, skewered imaging, contraction and expansion of a paper surface, curvature of a medium surface, and distortion when printing. Specifically, a function for calibration that converts distorted four reference grid point dots 4 to the original square $(X_n, Y_n)=f(Xn', Yn')$ is calculated, and the same function is used to calibrate an information dot 3 to acquire the vector of the correct information dot 3.

When reference grid point dots 4 are arranged in the dot pattern 1, as the image data obtained by retrieving this dot pattern 1 by the camera calibrates distortion caused by the camera, accurate recognition is possible even when retrieving image data of the dot pattern 1 by a popular camera equipped with a lens with high distortion rate. Also, the dot pattern 1 can also be accurately recognized even when the dot pattern 1 is read by inclining the camera with reference to the surface of the dot pattern 1.

The key dot 2 is a dot arranged by shifting four reference grid point dots 4 at the four corners of the block in a certain direction as shown in FIG. 2. This key dot 2 is a representative point of one block of the dot pattern 1 that represents an information dot 3. For example, this is obtained by shifting reference grid point dots 4 at four corners of one block of the dot pattern 1 upward by 0.1 mm. When an information dot 3 represents X and Y coordinate values, the coordinate point is a position obtained by shifting a key dot 2 downward by 0.1 mm. However, this numerical value is not limited to this and can vary depending on the size of the block of the dot pattern 1.

The information dot 3 is a dot used for recognition of a variety of information. This information dot 3 is positioned around a key dot 2 as a representative point and at the end point of a vector expressed with a start point of a virtual grid point 5 at a center surrounded by four reference grid point dots 4.

For example, this information dot 3 is surrounded by reference grid point dots 4, and, as shown in FIG. 3A, as a dot away from the virtual grid point 5 by 0.1 mm has a direction and a length expressed by a vector, three bits are expressed by rotating and arranging the dot in eight directions by 45 degrees in a clockwise direction. Therefore, one block of the dot pattern 1 can express 3 bits×16=48 bits.

FIG. 3B is a method for defining an information dot 3 that has two bits per grid in the dot pattern of FIG. 2 and defines two bit information by shifting the dot in + direction and × direction. In this way, while 48-bit information can be defined indeed, data can be given for each 32 bits by dividing according to use purposes. Maximum of $2^{16}$ (approximately 65,000) patterns of dot pattern formats can be realized by combining + direction and × direction.

It will be appreciated that, while three bits are expressed in the illustration by arranging dots in eight directions, the arrangement can vary in many ways without limiting to this including expressing four bits by arranging in 16 directions.

The diameter of the key dot 2, information dot 3, or reference grid point dot 4 is preferably approximately 0.05 mm in consideration of visual quality, printing accuracy in relation to a paper property, the resolution of the camera, and optimal digitization.

Also, in consideration of required information amount for the imaging area and false recognition of respective dots 2, 3, and 4, the gap between reference grid point dots 4 is preferably approximately 0.5 mm in vertical and horizontal directions. Displacement of the key dot 2 is preferably approximately 20% of the grid gap in consideration of false recognition with the reference grid point dot 4 and information dot 3.

The gap between this information dot 3 and a virtual grid point 5 surrounded by four reference grid point dots 4 is preferably approximately 15 to 30% of the distance between adjacent virtual grid points 5. If the distance between the information dot 3 and the virtual grid point 5 is closer than this gap, the dots are easily recognized as a large cluster, and looks ugly as the dot pattern 1. On the other hand, if the distance between an information dot 3 and a virtual grid point 5 is farther than this gap, it is difficult to recognize which adjacent virtual grid point 5 is used as a center for the information dot 3 to have a vector direction.

For example, as shown in FIG. 4A, as the grid gap is 0.5 mm when arranging the information dots 3 $I_1$ to $I_{16}$ from the center of the block in a clockwise direction, 3 bits×16=48 bits are expressed in 2 mm×2 mm.

It should be noted that subblocks that have respective independent information contents and are not affected by other information contents can be provided in the block. FIG. 4B illustrates this, and respective independent data (3 bits×4=12 bits) are deployed in information dots 3 in the subblocks each constituted by four information dots 3 $[I_1, I_2, I_3, I_4]$, $[I_5, I_6, I_7, I_8]$, $[I_9, I_{10}, I_{11}, I_{12}]$, $[I_{13}, I_{14}, I_{15}, I_{16}]$. By providing subblocks in this way, error check can be easily performed for each subblock.

The vector direction (rotation direction) of the information dot 3 is preferably evenly determined for each 30 degrees to 90 degrees.

Figure 5:
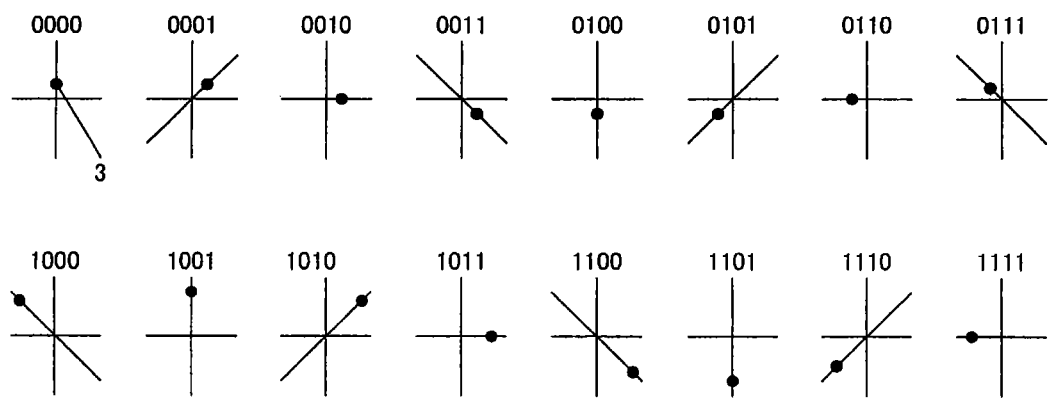
FIG. 5 is an explanatory diagram showing an example of information dots 3 and data defined therein.

FIG. 5 is an example of information dots 3 and bit expression of data defined therein, showing another embodiment.

Also, four bits can be expressed by using two kinds of information dots 3, long and short from a virtual grid point 5 surrounded by reference grid point dots 4 and defining the vector directions as eight directions. Here, long one is preferably approximately 25 to 30% of a distance between adjacent virtual grid points 5 and short one is approximately 15 to 20% thereof. However, the distance between the centers of the long and short information dots 3 is preferably longer than the diameter of these dots.

The information dot 3 surrounded by four reference grid point dots 4 is preferably one dot in consideration of visual quality. However, when visual quality is disregarded and information amount is desired to be increased, a large amount of information can be obtained by allocating one bit for one vector and expressing the information dot 3 using a plurality of dots. For example, in eight direction concentric vectors, an information dot 3 surrounded by four grid dots 4 can express $2^8$ pieces of information, expressing $2^{128}$ pieces of information with 16 information dots in one block.

Figure 6A:
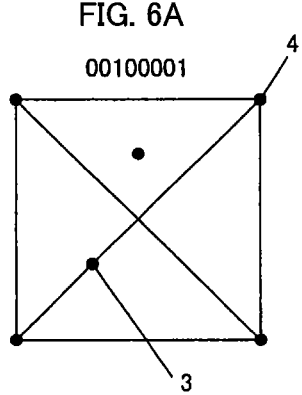
FIG. 6A to 6C are explanatory diagrams showing information dots and bit expression of data defined therein.
Figure 6B:
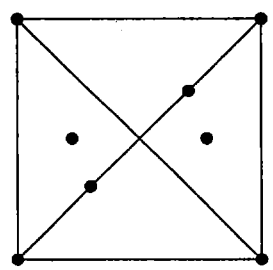
Figure 6C:
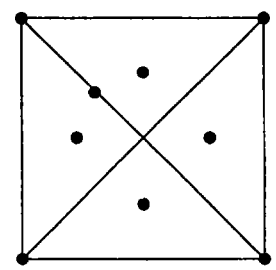

FIGS. 6A to 6C are examples of information dots and bit expression of data defined therein. FIG. 6A shows arranging of two dots. FIG. 6B shows arranging of four dots. FIG. 6C shows arranging of five dots.

FIGS. 7A to 7D show variants of the dot pattern. FIG. 7A is a schematic view of six-information dot arrangement. FIG. 7B is a schematic view of nine-information dot arrangement. FIG. 7C is a schematic view of 12-information dot arrangement. FIG. 7D is a schematic view of 36 information dot arrangement.

The dot pattern 1 shown in FIGS. 2, 4A and 4B shows an example of arranging 16 (4×4) information dots 3 in one block. However, this information dot 3 can vary in many ways without being limited to arranging 16 information dots 3 in one block. For example, depending on the size of the required information amount and the resolution of the camera, six information dots 3, that is, (2×3), may be arranged in one block (FIG. 7A), nine information dots 3, that is, (3×3), may be arranged in one block (FIG. 7B), 12 information dots 3, that is, (3×4), may be arranged in one block (FIG. 7C), or 36 information dots 3 may be arranged in one block (FIG. 7D).

Figure 8:
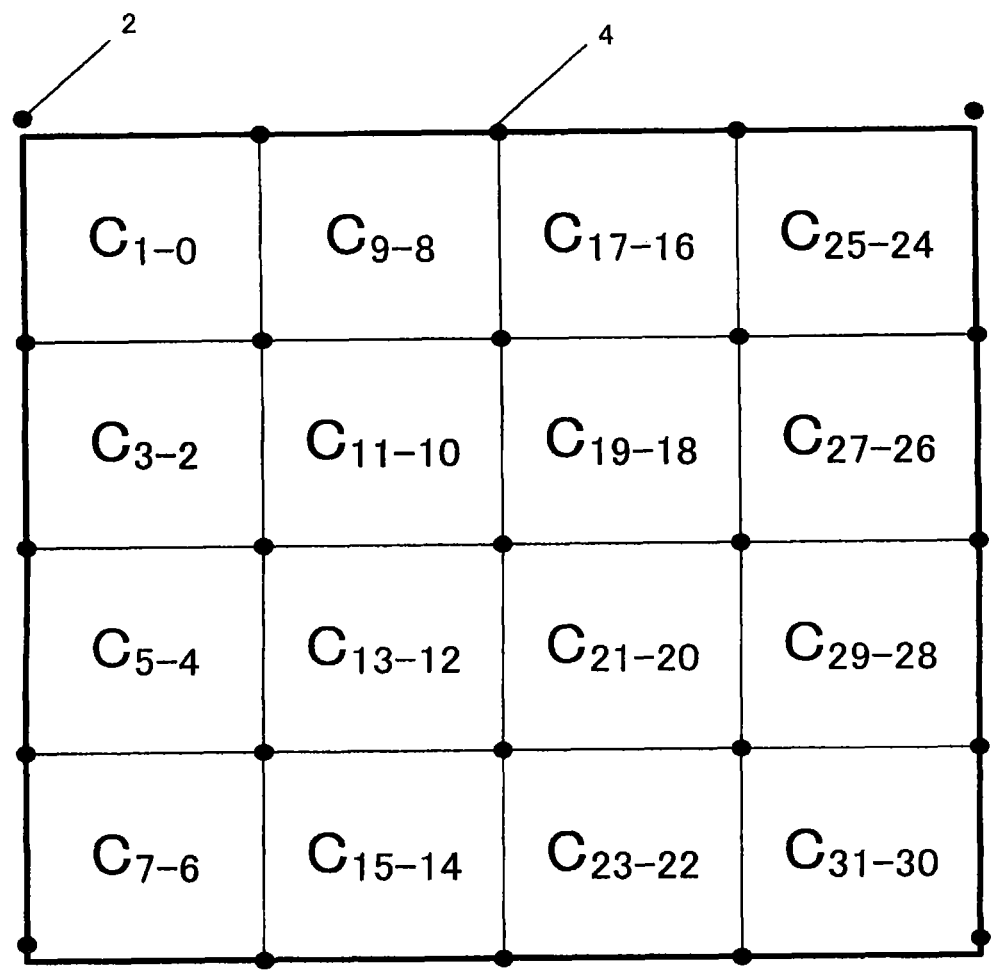
FIG. 8 is an explanatory diagram showing a relationship among a dot pattern, a code value, and an identifier.

FIGS. 8 to 9C are explanatory diagrams showing a relationship among a dot pattern, a code value, and an identifier.

The dot pattern is a dot pattern comprising 4×4-block areas, and divided into $C_{1-0}$ to $C_{31-30}$ within this block. FIGS. 9A to 9C show the dot code format of each area.

FIG. 9A is a case in which a dot pattern comprises only a code value. $C_0$ to $C_{27}$ register a code value for each dot of the dot pattern in respective areas shown in FIG. 8. Then, $C_{28}$ to $C_{30}$ register parity.

In FIG. 9B, X and Y coordinates are registered in addition to a code value. That is, in FIG. 8, $C_0$ to $C_7$ register an X coordinate, $C_8$ to $C_{15}$ register a Y coordinate, and $C_{16}$ to $C_{27}$ register a code value, respectively.

In this way, in this embodiment, X and Y coordinates can be registered in addition to a code value in a dot pattern.

Further, FIG. 9C is a format that registers a coordinate index as well as X and Y coordinates. The coordinate index is an area for registering a page number or the like of a paper as a medium, and can register an identifier that identifies a medium itself that registers X and Y coordinates and a page number in a dot pattern.

In this way, the dot pattern of the invention can take a flexible format, such as, a case of registering only a code value, a case of registering a code value and X and Y coordinates, and a case of registering a coordinate index and X and Y coordinates.

<Description of Dot Pattern; GRID3>

Figure 28A:
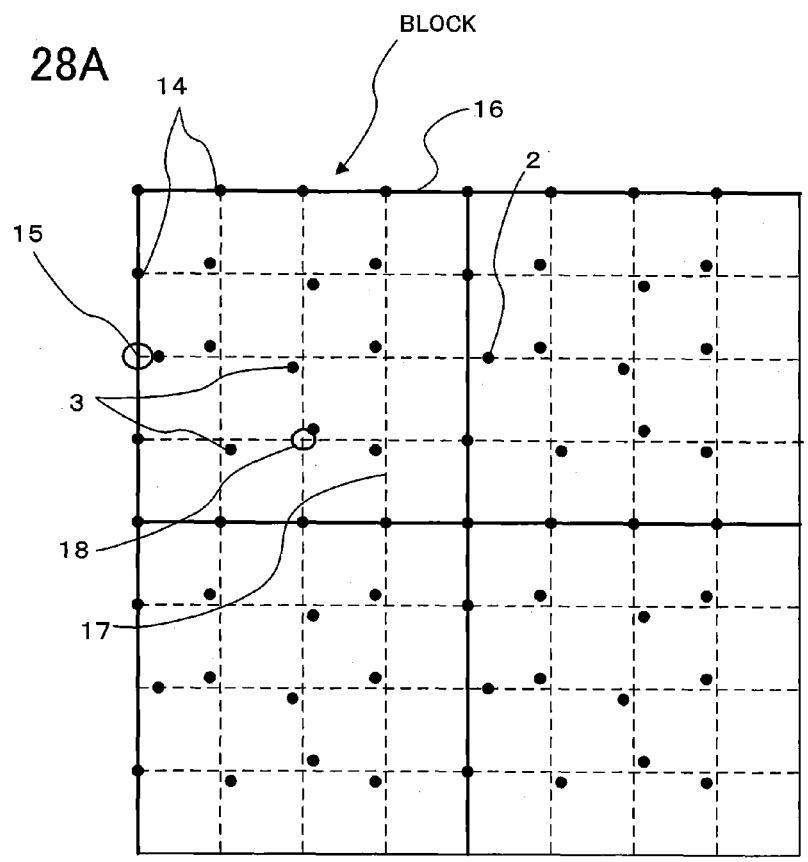
FIGS. 28A and 28B are explanatory diagrams showing GRID3 as an example of a dot pattern.
Figure 28B:
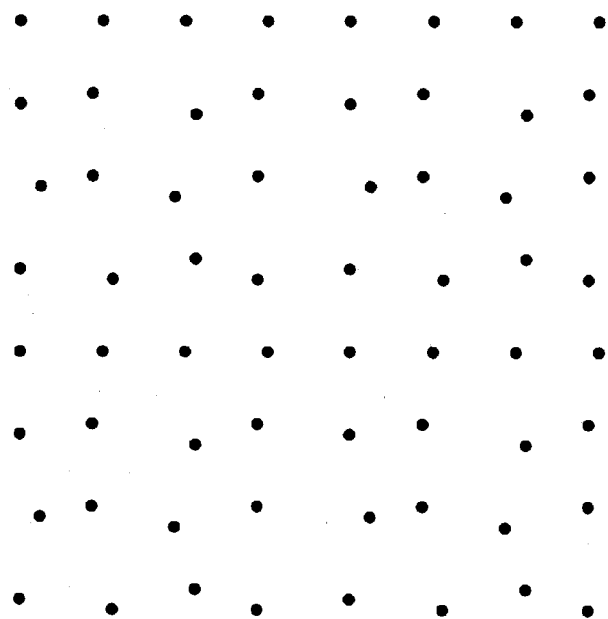

FIGS. 28A and 28B are explanatory diagrams showing an example of the dot pattern. FIG. 28A shows reference grid points 16 and grid lines 17 with solid lines, which will be described later for explanation. FIG. 28B shows an enlarged view of an actual dot pattern without such solid lines.

To input/output information using this dot pattern, after retrieving a dot pattern 1 as image data by a camera, reference grid point dots 14 are extracted first and determined as positions of virtual reference grid points 15, and a straight line connecting these virtual reference grid points 15 is defined as a reference grid line 16. Then, when there is no dot arranged at a position of a virtual reference grid point 15 where a reference grid point dot 14 is supposed to exist on this reference grid line 16, a dot around this virtual reference grid point 15 is extracted and defined as a key dot 2 (four corners of a block). Next, vertical and horizontal grid lines 17a, 17b, that connect the virtual reference grid points 15 are set and an intersection of the grid lines 17a and 17b is defined as a virtual grid point 18. Then, a dot around this virtual grid point 18 is searched, and an information dot 3 defined by a direction and a distance from this virtual grid point 18 is extracted. Next, the orientation of the block is determined by the direction of the key dot 2 from a virtual reference grid point 15 or a virtual grid point 18. For example, if the key dot 2 is shifted in a +y direction from the virtual grid point 18, the information dot 3 in a block may be recognized by defining a vertical direction as a standard orientation.

<Description of Dot Pattern; Stream Dot Pattern>

The following describes another embodiment used in the invention.

Figure 10A:
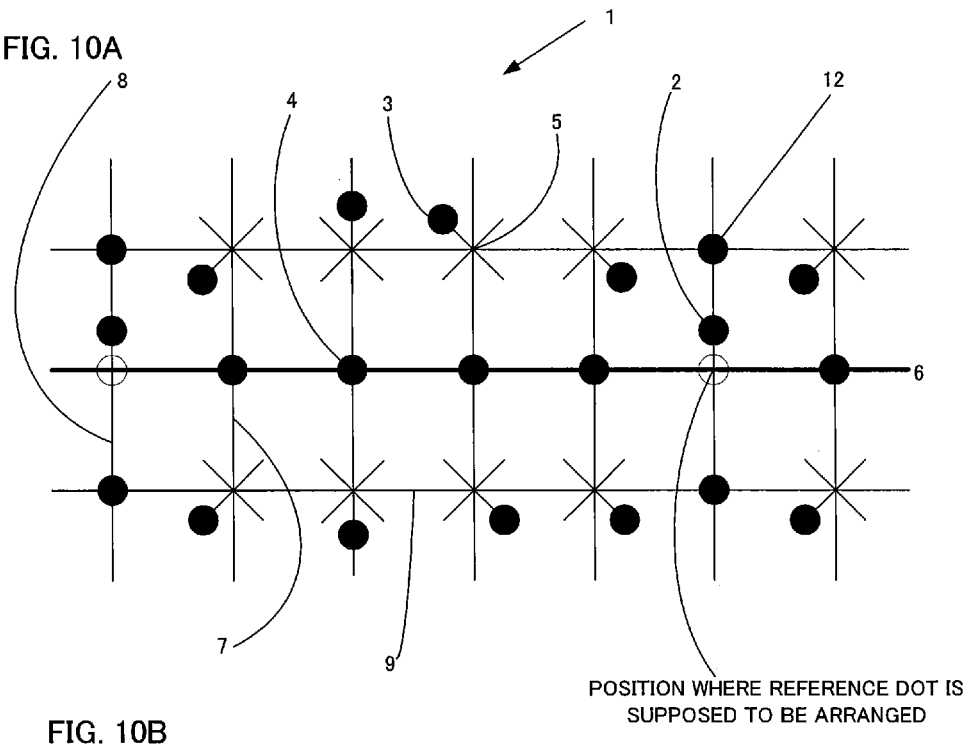
FIGS. 10A to 10C are explanatory diagrams showing a stream dot pattern as an example of the dot pattern.
Figure 10B:
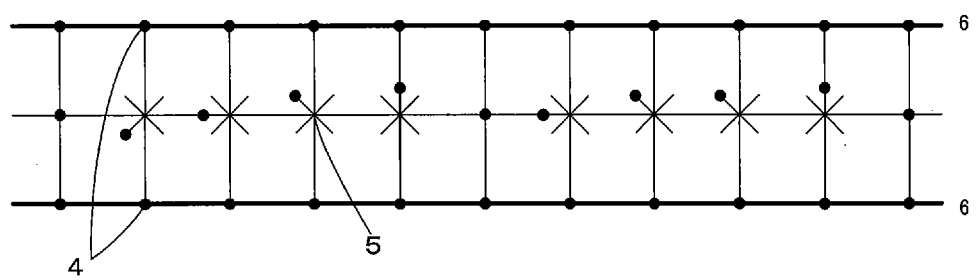
Figure 10C:
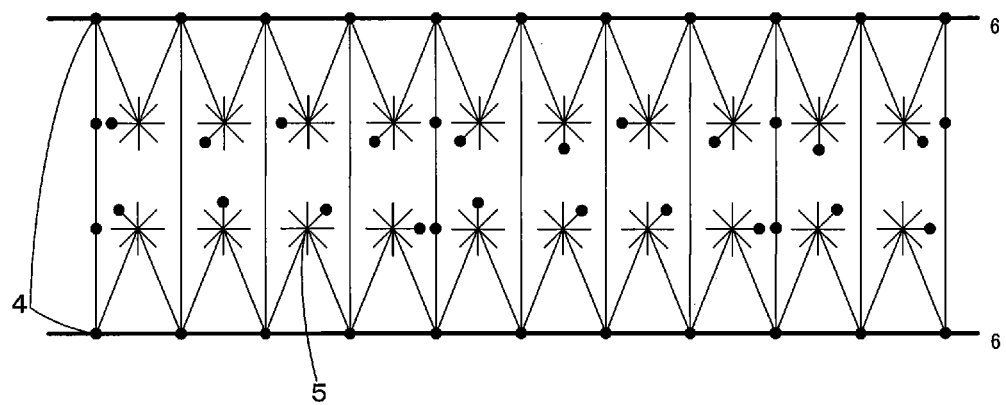
Figure 11:
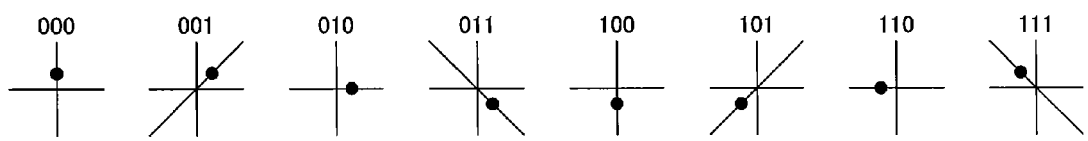
FIG. 11 is an explanatory diagram showing an example of information dots and bit expression of data defined therein.

FIGS. 10A to 10C are explanatory diagrams showing an example of the dot pattern of the invention, and FIG. 11 is an enlarged view of an example of information dots and bit expression of data defined therein.

The information input/output method using the dot pattern of the invention comprises a unit for recognizing a dot pattern 1, a unit for outputting information from this dot pattern 1, and a unit for executing a program.

That is, after retrieving a dot pattern 1 formed in an area for giving information (for example, actual lines and texts formed on a medium) as image data by an optical reading unit, reference dots 4 are extracted first, and a line connecting these reference dots 4 is defined as a first virtual reference line 6. Then, when there is no dot at a position where the reference dot 4 is supposed to exist on the first virtual reference line 6, a dot around the position where this reference dot 4 is supposed to be arranged is extracted and defined as a key dot 2 (both ends of a set of information). Then, a side dot 10 that is arranged on a positive and negative extension line of displacement of the key dot 2 is extracted, and a straight line that passes through the side dot 10 and the key dot 2 and is perpendicular to the first virtual reference line 6 is defined as a third virtual reference line 8.

Then, a second virtual reference line 7 that passes through the reference dot 4 and is perpendicular to the first virtual reference line 6 is defined, and a fourth virtual reference line 9 that passes through the side dot 10 and is parallel to the first virtual reference line 6 and is defined, then, the intersection of the virtual reference lines is defined as a virtual reference point 5. Then, by searching around this virtual reference point 5, an information dot 3 that defines information by a distance and a direction from this virtual reference point 5 is extracted.

Here, as the ratio between the arrangement interval of the reference dots 4 and a distance from the first virtual reference line 6 to the side dot 10 is one to one, the position of the virtual reference point 5 can be supplementarily calculated by defining a square of which horizontal to vertical ratio with a reference dot 4 as an apex is one to one on the virtual reference point 6. It should be noted that the vertical to horizontal ratio can be arbitrary determined.

Next, the orientation of the set of certain information, that is, the direction of the dot pattern 1, is determined by the direction of the key dot 2 from the first virtual reference line 6. For example, if the key dot 2 is shifted in a +Y direction from the first virtual reference line 6, an information dot 3 within a set of certain information may be recognized by defining the direction as the standard orientation.

Also, if a key dot 2 is shifted in a -Y direction from the first virtual reference line 6, an information dot 3 in the set of certain information may be recognized by defining a direction obtained by rotating the set of certain information by 180 degrees with the center thereof as an axis as the standard orientation.

Here, the direction of the dot pattern 1 can be defined by a distance between the side dot 10 and the key dot 2. For example, if a distance from the key dot 2 to a side dot 10 arranged in a +Y direction is shorter than a distance from the key dot 2 to a side dot 10 arranged in a -Y direction, an information dot 3 within the set of certain information may be recognized by defining the +Y direction as the standard orientation.

Also, if a distance from the key dot 2 to a side dot 10 arranged in a -Y direction is shorter than a distance from the key dot 2 to a side dot 10 arranged in a +Y direction, an information dot 3 within the set of certain information may be recognized by defining a direction obtained by rotating the set of certain information by 180 degrees with the center thereof as an axis as the standard orientation.

When an image of a dot pattern 1 read out by the optical reading unit is accumulated in a frame buffer, the central processing unit (CPU) of the optical reading unit analyzes dots in the frame buffer and decodes numerical values defined for each information dot 3 (refer to FIGS. 11 to 13C) by a distance and a direction of each information dot 3 from a virtual reference point 5. Then, these numerical values are matched with information stored in the memory of the optical reading unit or a personal computer as X, Y, and Z coordinates or a code value, whereby a sound, an image, a motion picture, a text, a program and the like corresponding to the X, Y, and Z coordinates or the code value are read out and output from the display unit, and the sound and image output unit.

To generate the dot pattern 1 of the invention, fine dots, that is, key dots 2, information dots 3, reference dots 4, and side dots 10 are arranged according to a predetermined rule based on a dot code generation algorithm for recognition of information such as a sound and the like (For example, dots as reference points are continuously arranged in a line, virtual reference lines that constitutes a polygon using the arranged plurality of reference dots are provided, a virtual reference point is provided at the apex of the polygon, and a dot that defines information is provided at the end point of a vector with the virtual reference point as the start point. It should be noted that the direction of the dot pattern can be defined by the shape of this polygon).

As shown in FIG. 10A, the horizontal straight line constituting a set of certain information of a dot pattern 1 formed along reference dots 4 arranged in a line (a straight line in this illustration) is provided on a medium as the first virtual reference line 6.

Next, a side dot 10 is provided on a third virtual reference line 8 that passes through a reference dot 4 (a reference dot arranged as a key dot 2 in this illustration) and is perpendicular to the first virtual reference line 6. Then, a straight line that passes through a reference dot 4 and is parallel to the third virtual reference line 8 is defined as a second virtual reference line 7, and a straight line that passes through the side dot 10 and is parallel to the first virtual reference line 6 is defined as a forth virtual reference line 9. Further, the direction of the dot pattern is defined by the direction of the key dot 2 arranged on a predetermined position on the medium (on the third virtual reference line 8 in this illustration) shifted from the first virtual reference line 6 and the distance of the key dot 2 from the side dot 10, and a set of certain information of a dot pattern 1 is defined from the arrangement interval of the side dots 10 and/or key dots 2.

It should be noted that it is possible to form this dot pattern 1 along actual lines visibly formed on a medium surface, in which the actual lines here is a concept contrary to the virtual lines and includes all lines that actually exist.

For example, there are solid lines, dash lines, dotted lines, straight lines, and curved lines. In this invention, the lines may be formed on any medium (for example, a display of a video image display device) and with any material (for example, ink). It should be noted that the dot pattern may be a print, displayed on a display, or holes or unevenness such as grooves and the like on metal and plastic.

Then, the intersection of the second virtual reference line 7 and the fourth virtual reference line 9 is defined as a virtual reference point 5.

The dot pattern 1 is generated by arranging one or a plurality of information dots 3 having a distance and a direction with reference to a virtual reference point 5 configured in this way.

When retrieving the dot pattern 1 as image data by an optical reading unit, distortion due to the distortion of the lens and the like of the optical reading unit, skewered imaging, expansion and contraction of a paper surface, curvature of a medium surface, and distortion during printing can be calibrated by the reference dots 4. Specifically, a function that converts distorted plurality of virtual reference points 5 into the original polygon (a square in this illustration) is calculated $(X_n, Y_n)=f(X'n, Y'n)$, and the same function is used to calibrate an information dot 3 to obtain the correct vector of the information dot 3.

If reference dots 4 are arranged in the dot pattern 1, as image data obtained by retrieving the dot pattern 1 by the optical reading unit is calibrated distortion caused by the optical reading unit and/or distortion due to skewered imaging, even when skewered imaging by a popular camera with a lens of high distortion rate retrieves image data of the dot pattern 1, the dot pattern 1 can be correctly recognized. Also, by reading the dot pattern 1 by inclining the optical reading unit, the dot pattern 1 can be correctly recognized according to a predetermined algorithm.

The key dot 2 is a dot arranged at both ends of a set of certain information as shown in FIG. 10A. This key dot 2 is a representative point of an area of the dot pattern 1 that represents a set of information. It should be noted that the representative point may be arranged anywhere in the set of information. For example, if the gap between adjacent reference dots is 0.5 mm, the representative point is arranged at a position that is shifted upward by 0.1 mm from a position where a reference dot 4 at the end of the area of the dot pattern 1 is supposed to be arranged. Therefore, if an information dot 3 is defined by X and Y coordinate values from a reference dot 4, a position downward by 0.1 mm from the key dot 2 becomes the coordinate point. However, this numerical value (0.1 mm) is not limited to this, and may vary depending on the size of the area of the dot pattern 1.

The information dot 3 is a dot used for recognition of a variety of information. This information dot 3 is the one arranged at the end point of a vector expressed with a virtual reference point 5 as the start point. For example, as shown in FIG. 11, as this information dot 3 apart from the virtual reference point 5 by 0.1 mm has a direction and length as expressed by a vector, the dot expresses three bits by rotating in a clockwise direction by 45 degrees each in eight directions.

According to FIG. 11, a set of certain information can express 3 bits×8=24 bits.

It will be appreciated that, while, in this illustration, three bits are expressed by arranging the information dot in eight directions, the dot can be arranged in arbitrary direction and length including expressing of four bits by arranging in 16 directions.

Further, while, in FIG. 10A, the information dots 3 are arranged at the end points for all virtual reference points 5 defined as the start points, without limiting to this, information may be defined whether or not a dot is arranged on a virtual reference point. For example, if a dot is arranged on a virtual reference point, information can be defined as "1," and if no dot is arranged thereon, "0."

The diameter of a key dot 2, an information dot 3, a reference dot 4, and a side dot 10 is preferably approximately 0.03-0.05 mm in consideration of visual quality, printing accuracy for a paper property, the resolution of the optical reading unit, and an optimal calculation speed. However, it will be appreciated that the diameter of the dot becomes closer to 0 without limit, if printing accuracy, the resolution of the optical reading unit, and the optimal calculation speed are improved by technical development.

As the result, all information can be recognized at once by not only imaging an arbitrary position on a medium surface but also imaging the entire medium surface. It will be appreciated that, even at present, if a high-precision scanner is used, information defined over the entire medium surface can be recognized at once. On the other hand, if the dots are printed on a huge medium and imaged from far away, the diameter of the dots and arrangement interval may be appropriately determined based on the resolution of the optical reading unit and optimal calculation speed.

Also, in consideration of the information amount required for an imaging area and false recognition of respective dots 2, 3, 4, and 12, the gap of reference dots 4 is preferably approximately 0.3 to 0.5 mm. It will be appreciated that the gap also becomes closer to 0 without limit, if printing accuracy, the resolution of the optical reading unit, and optimal calculation speed are improved by technical development. In consideration of false recognition with a reference dot 4 and an information dot 3, the displacement of a key dot 2 is preferably approximately 20% of the gap of reference dots 4.

It is preferable that the gap between this information dot 3 and a virtual reference point 5 is a gap approximately 15-30% of the distance between adjacent virtual reference points 5. If the distance between the information dot 3 and the virtual reference point 5 is shorter than this gap, the dots are easily recognized as a large cluster, and look ugly as the dot pattern 1. On the other hand, if a distance between the information dot 3 and a virtual reference point 5 is farther than this gap, it becomes difficult to judge which adjacent virtual reference point 5 is defined as a center for the information dot 3 to have a vector direction.

Reading of the dot pattern of the invention is performed by an optical reading unit (for example, a camera or a scanner), and performed by reading a dot pattern on a predetermined position, a predetermined area, or the entire area by or without touching the medium surface, or tracing and reading a dot pattern formed in a line.

That is, reading of the dot pattern is done whether by imaging a predetermined position or a predetermined area on a medium surface above the medium surface using an optical reading unit and reading information that is defined therein; imaging the entire medium surface from a predetermined distance from the medium surface using a high resolution camera; or reading information defined in the entire medium surface using a high resolution scanner.

Also, if an enormous amount of information is defined by defining information in a dot pattern of sufficient length, the information can be read out by tracing the area on which the dot pattern is formed on a medium surface.

That is, information is read out by tracing lines that draw drawings or figures visibly formed on a medium surface, or information is read out by tracing the frames of photographs and images or the outlines of objects within the photographs and images. Also, information can be read out by tracing along text strings on a medium surface.

Figure 12:
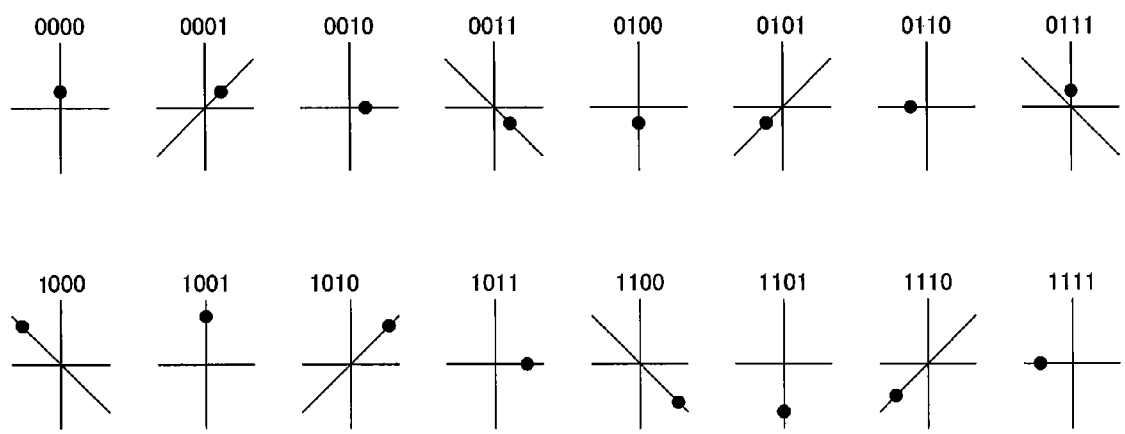
FIG. 12 is an explanatory diagram showing an example of information dots and bit expression of data defined therein.

FIG. 12 is an example of information dots and bit expression of data defined therein, and shows another embodiment.

Also, if two kinds of information dots 3, short (the upper row of FIG. 12) and long (the lower row of FIG. 12) from a virtual reference point 5 that is calculated from reference dots 4, are used and vector directions are eight directions, four bits can be expressed. Here, the long one is preferably 25 to 30% of the distance between adjacent virtual reference points 5, and the short one is preferably 15 to 20% thereof. However, the gap between the long/short information dots 3 is preferably longer than the diameter of these dots.

The information dot 3 is preferably one dot in consideration of the visual quality. However, if visual quality is disregarded and information amount is required to be large, a large amount of information can be obtained by allocating one bit for one vector and expressing the information dot 3 using a plurality of dots. For example, with concentric eight direction vectors, $2^8$ pieces of information can be expressed by the information dot 3 defined based on reference dots 4, expressing $2^{64}$ pieces of information with eight information dots of sets of certain information.

Figure 13A:
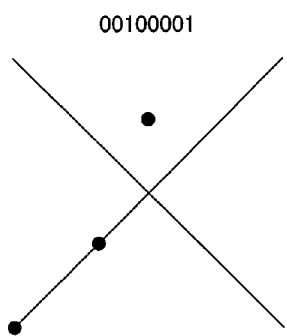
FIGS. 13A to 13C are explanatory diagrams showing an example of information dots and bit expression of data defined therein.
Figure 13B:
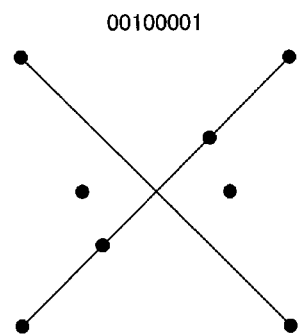
Figure 13C:
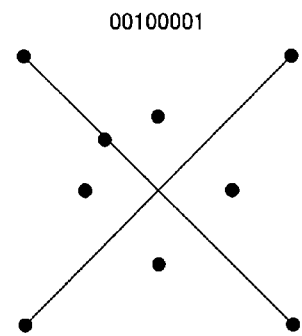

FIGS. 13A to 13C are examples of information dots 3 and bit expression of data defined therein. FIG. 13A shows arranging of two dots. FIG. 13B shows arranging of four dots. FIG. 13C shows arranging of five dots.

FIGS. 14A to 14B show variants of the dot pattern. FIG. 14A is arranging 12 information dots 3 within an area. FIG. 14B is arranging 16 information dots 3. FIG. 14C is arranging 24 information dots 3.

As described above, the dot pattern 1 shown in FIG. 10A shows an example in which eight information dots 3 are arranged in a set of certain information. However, this information dot 3 is not limited to arranging eight dots in a set of certain information, and can vary in many ways. For example, depending on the size of the required information amount and the resolution of the optical reading unit, there could be arranging of 12 information dot 3 in a set of certain information (FIG. 14A), arranging of 16 information dot 3 in a set of certain information (FIG. 14B), and arranging of 24 information dot 3 in a set of certain information (FIG. 14C).

Figure 31A:
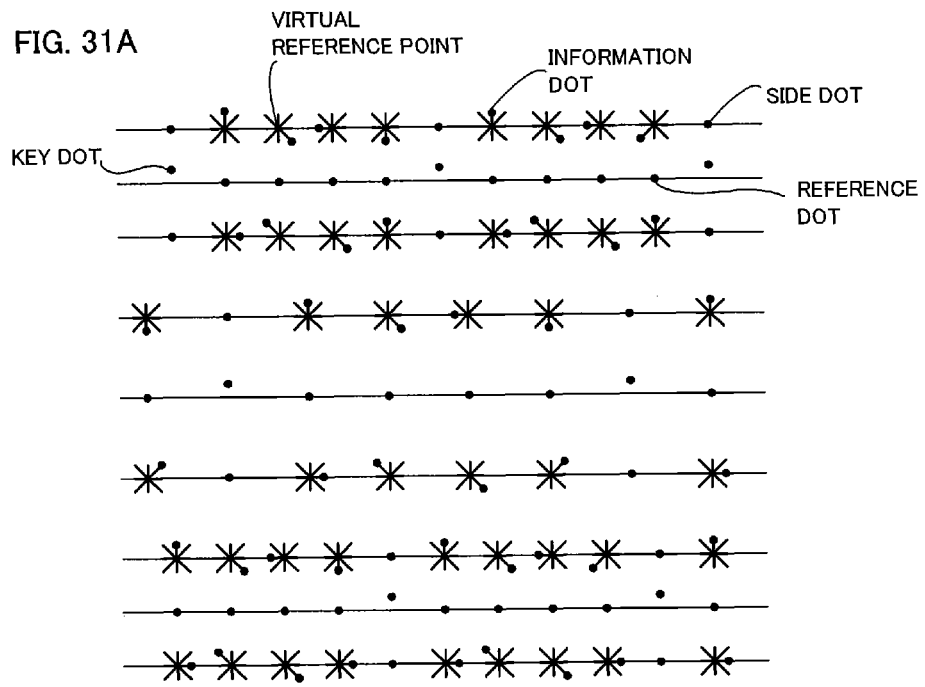
FIGS. 31A and 31B are explanatory diagrams of an example of arranging stream dot patterns in vertical directions.
Figure 31B:
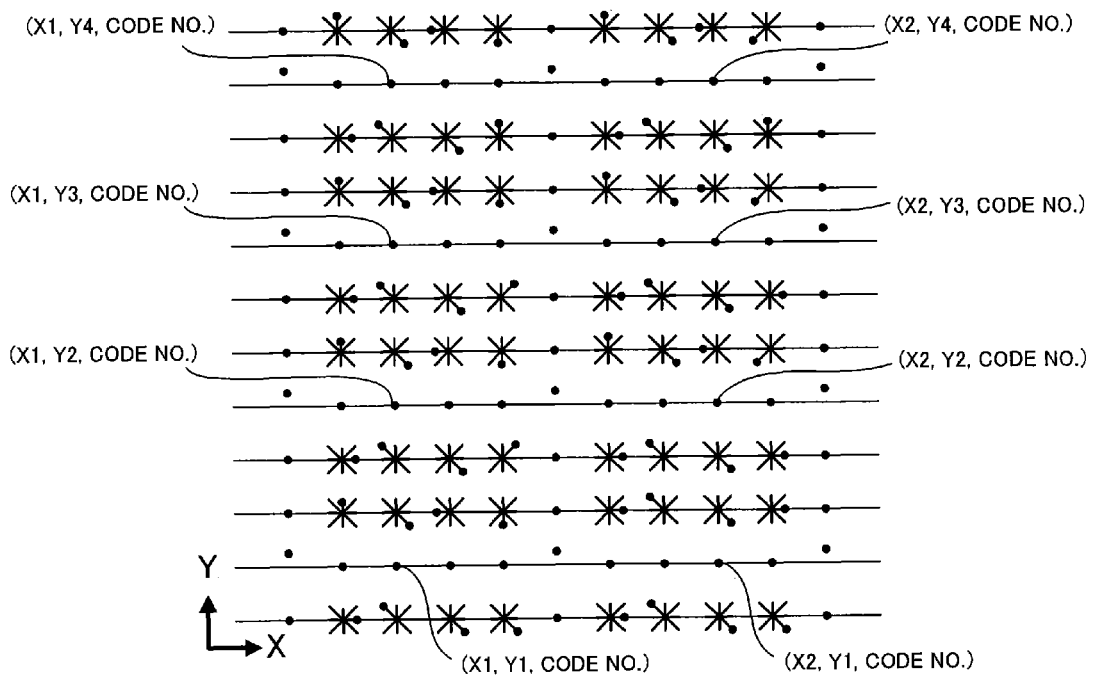

FIGS. 31A and 31B are diagrams showing an example of a state in which stream dot patterns are arranged in a vertical direction.

In FIGS. 31A and 31B, key dots and side dots are arranged in addition to reference dots and information dots. The key dot is a dot arranged at both ends of a set of certain information. This key dot is a representative point of one area of a dot pattern 1 that represents a set of information dots. The side dot is a dot arranged on a positive and negative extension line of displacement of the key dot 2.

FIG. 31B arranges reference dots and stream dot patterns with even intervals. As shown in FIG. 31B, by forming a plurality of stream dot patterns in which the interval of reference points are constant, X and Y coordinate values are defined without a gap on a writing area so as to generate trajectory information. However, the stream dot pattern of the invention is not limited to this, and, as shown in FIG. 31A, the interval of the dot patterns may be arbitrary set. Also, the interval of the reference dots can be arbitrary set.

In this way, without limiting to the shape of a rectangular area when forming a dot pattern that defines X and Y coordinates as a two dimensional code (using as an index), the dot pattern can be formed by repeating a set of certain information in a free shape tailored to an information area visibly formed on a medium surface.

<Method of Forming a Stream Dot Pattern>

The following describes a method of forming a dot pattern with reference to FIGS. 15A to 15E.

FIGS. 15A to 15E show an example of the steps of forming a stream dot pattern in sequence.

Unlike the conventional dot patterns, in the dot pattern of the invention, as step 1, a plurality of reference dots 4 are repeatedly arranged in a line at a position where information is desired to be input/output corresponding to visual information on a medium surface.

Figure 15A:
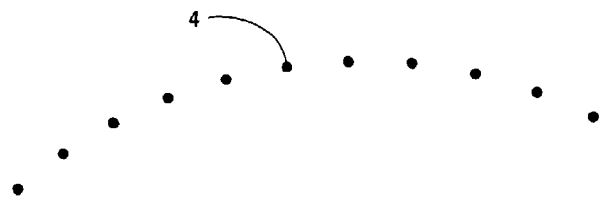
FIGS. 15A to 15E are explanatory diagrams showing an example of steps of forming a stream dot pattern.
Figure 15B:
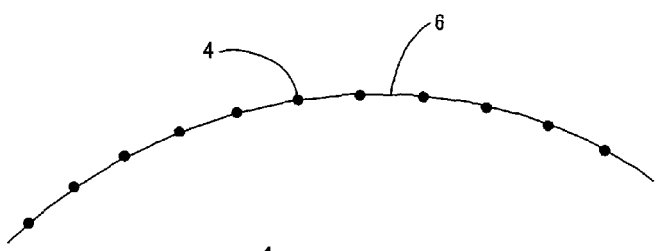

While FIG. 15A arranges reference dots 4 in a curved line, arrangement of reference dots 4 is not limited to this, and may vary in many ways in order to form a dot pattern in a shape that fits to an area for inputting and outputting information, such as combining straight lines and curved lines, and forming a polygonal line constituted by a plurality of line segments.

Also, reference dots 4 may be arranged on actual lines visibly formed on a medium surface, or reference dots 4 may be arranged in accordance with a predetermined rule along actual lines.

It should be noted that, while reference dots are preferably arranged with even interval in consideration of improvement in reading accuracy, without limiting to this, a set of certain information of a dot pattern can be defined by combining a plurality of intervals, or both a set of certain information of a dot pattern and the direction of the dot pattern can be defined using three different arrangement intervals of reference dots within a set of certain information.

Next, as step 2, the first virtual reference line 6 that connects reference dots 4 arranged in a line is provided. While the first virtual reference line 6 is provided as a curved line in FIG. 15B, the first virtual reference line 6 is not limited to this, and the first virtual reference line 6 of a straight line may be provided for reference dots 4 arranged in a straight line, or the first virtual reference line 6 of a curved line may be provided for reference dots 4 arranged in a straight line. That is, depending on where to arrange the second virtual reference line 7, virtual reference point 5, and information dot 3 in the following steps 3 to 5 that are described later, the first virtual reference line 6 constituted by a straight line, a polygonal line, and/or a curved line that connects reference dots can be freely defined.

Figure 16:
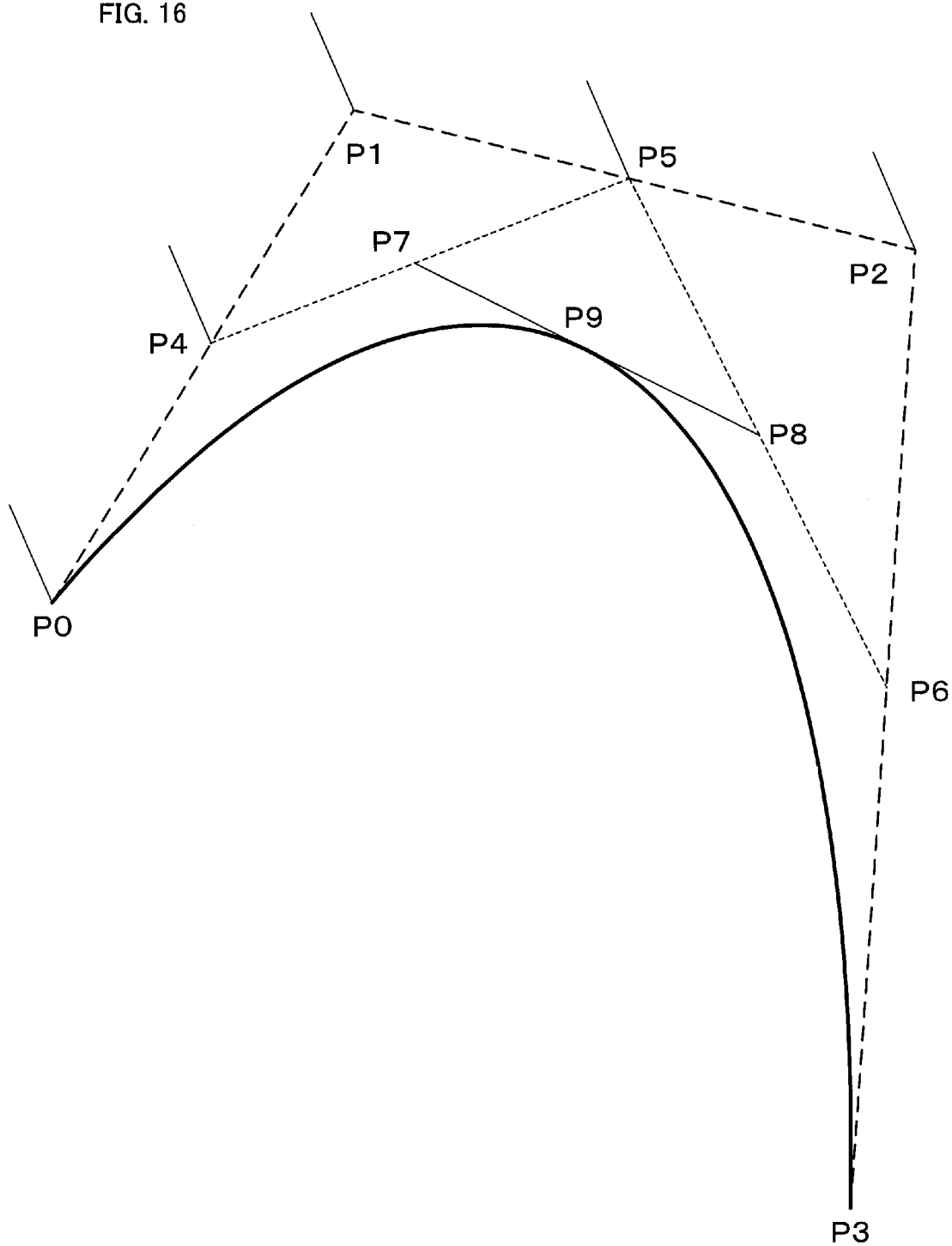
FIG. 16 is an explanatory diagram showing an example of steps of forming a stream dot pattern.

It should be noted that, as shown in an example of FIG. 16, if the first virtual reference line 6 is a curved line, the curved line is preferably a bezier curve.

That is, first, reference dots on the first virtual reference line are defined as P0 and P3, and P1 and P2 are defined as given control points. Next, points, P4, P5, and P6, that divide three line segments obtained by sequentially connecting the control points, P0-P1, P1-P2, and P2-P3, in a ratio of 1 to 1 are calculated. Then, points P7 and P8 that divide two line segments obtained by sequentially connecting above points, P4-P5 and P5-P6, in a ratio of 1 to 1 are calculated.

Finally, a point P9 that divides a line segment P7-P8 that connects the points P7 and P8 in a ratio of 1 to 1 is calculated, and this point becomes as a point on a bezier curve.

By repeatedly perform this step, a bezier curve with control points P0, P1, P2, and P3 can be obtained.

It should be noted that, without limiting to a bezier curve, the first virtual reference line 6 may be provided using a variety of algorithms such as a spline curve obtained by utilizing a spline function, an nth-order polynomial, an elliptic arc, and the like.

Also, for the second virtual reference line and the fourth virtual reference line that will be described later, a curved line can be defined using the same method as the first virtual reference line.

Figure 15C:
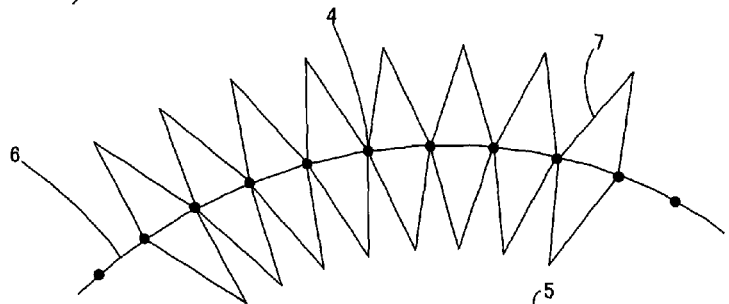

Next, as step 3, a second virtual reference line 7 that is defined at a predetermined position from the reference dots 4 arranged in a line and/or the first virtual, reference line 6 is provided. In FIG. 15C, the second virtual reference line 7 is provided with arbitrary angle from neighboring reference dots 4 toward a predetermined point on a vertical line to a tangent line of the first virtual reference line 6 at a middle point between the neighboring reference dots 4. However, the second virtual reference line 7 is not limited to this and may be defined by a variety of ways to provide virtual reference points to fit an area where information is desirably input/output by the dot pattern as described later.

Also, the second virtual reference line 7 can be provided only on one side of the first virtual reference line 6 to define the direction of the dot pattern, or the second virtual reference lines 7 can be provided on both sides thereof to increase the information amount.

Figure 15D:
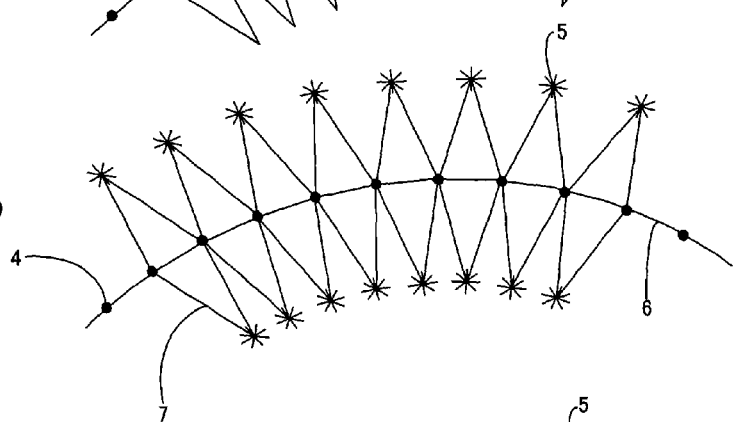
Figure 15E:
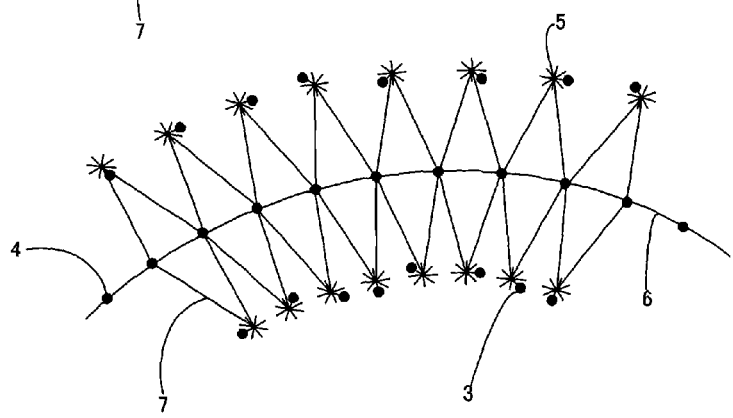

Next, as step 4, a plurality of virtual reference points 5 are provided at predetermined positions on the second virtual reference line 7. In FIG. 15D, a virtual reference point 5 is provided at an intersection of the second virtual reference lines 7, that is, at a vertex of an isosceles triangle with a straight line that connects neighboring reference dots 4 as a base and the second virtual reference lines 7 as opposing sides. However, the position of the virtual reference point 5 is not limited to this, and may vary in many ways such as providing at a midpoint of the second virtual reference line 7 or on a reference dot 4 instead of on the second virtual reference line 7.

Then, as step 5, an information dot 3 is arranged at the end point of a vector expressed with a virtual reference point 5 as the start point. In FIG. 16E, vector directions from a virtual reference point 5 are eight directions and an information dot 3 is arranged for one virtual reference point 5 to make a distance from the virtual reference point 5 an equal distance. However, arrangement of the information dot 3 is not limited to this, and a plurality of information dots 3 can be arranged in arbitrary direction and arbitrary length, such as arranging an information dot 3 on a virtual reference point 5, arranging with 16 vector directions, or, arranging two information dots 3 for one virtual reference point 5.

In this way, unlike the reference points two-dimensionally formed in grids in the conventional dot patterns proposed by the inventor, the stream dot pattern of the invention is formed based on the reference dots sequentially arranged in a line including a curved line.

In this way, without being limited to the shape of the rectangular in which a dot pattern is formed as a two-dimensional code, the dot pattern can be formed in a free shape as a set of certain information tailored to the information area visibly formed on a medium surface.

It should be noted that the virtual reference lines and virtual reference points of the invention are not actually printed and formed on a medium surface but only virtually set on an image memory of a computer when arranging a dot pattern or reading a dot pattern.

Also, as the dot pattern illustrated in FIGS. 10B and 10C, the dot pattern may be formed by defining a second virtual reference line between two or more first virtual reference lines and arranging information dots.

In such a case in which a virtual reference point is provided between two or more first virtual reference lines, the position where a virtual reference point is provided is not limited to the midpoint as illustrated in FIG. 10B, it is preferable to provide a virtual reference point at the midpoint so that the position of the virtual reference point is easily and correctly identified from the position of the corresponding reference dot, the recognition rate is improved, and calculation speed is increased.

(Method of Continuously Outputting Contents)

The following describes a method of continuously outputting content data that is registered in a link table by associated with a code value and X and Y coordinate values signified by a dot code.

Firstly, the first method is described with reference to FIGS. 17A to 17C.

Figures 17, 17A, 17B:
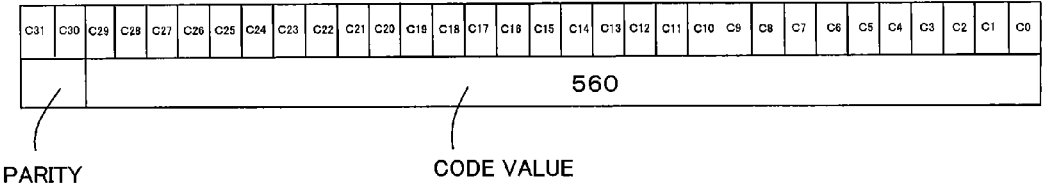

FIGS. 17A to 17C show an example of a dot code obtained by analyzing and converting a dot pattern, a link table in which the dot code and content data to be output is associated, and a content file in which the content data is stored.

First, when the dot pattern is analyzed by a processing unit, the dot pattern is digitized and converted into a dot code as shown in FIG. 17A. FIG. 17A shows a dot code format in which the converted dot code defines a code value (560). It should be noted that the value defined by a dot code is not limited to a code value, and a coordinate value can also be defined.

Then, the control unit refers to a link table using a code value (560) defined by the dot code, and instructs the output unit to output content data associated with the code value in the link table.

When outputting content data, the file name of a content file or the address of the content file that are registered in the link table by being associated with the code value are confirmed, read out from the storage unit, and output by the output unit.

The content data is stored in a content file with the file name, and the content file is stored in the storage unit.

Also, as shown in FIG. 17B, the file names and addresses of a plurality of content files can be associated and registered with one code value in the link table.

In such a case, first, among plurality pieces of content data associated with one code value, the one at the uppermost is output by the output unit. After that, among the plurality pieces of content data associated with the one code value, the one at the next higher order is continuously output. When all content data associated with the one code value is output by repeating these steps, continuous output of the content data ends.

It should be noted that the order of the content data registered in the link table may be, if the content data is sound, the date order of recording the sound or the alphabetical order of the file names. Also, the order can be changed even after registering in the link table using the method described later.

Next, with reference to FIGS. 18A to 18F, the second method of continuously outputting content data will be described.

Figure 18A:
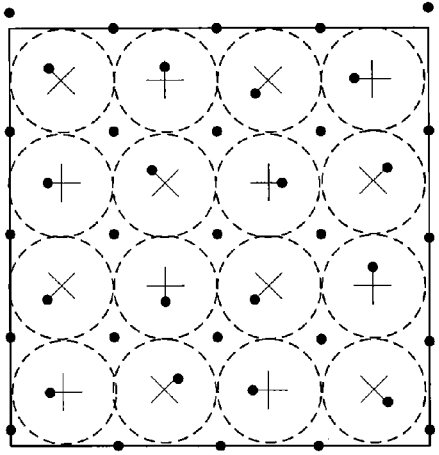
FIGS. 18A to 18F are explanatory diagrams showing an example of a dot pattern and a code format.

FIG. 18A is an enlarged view showing a dot pattern formed in a printed area.

Figure 18B:
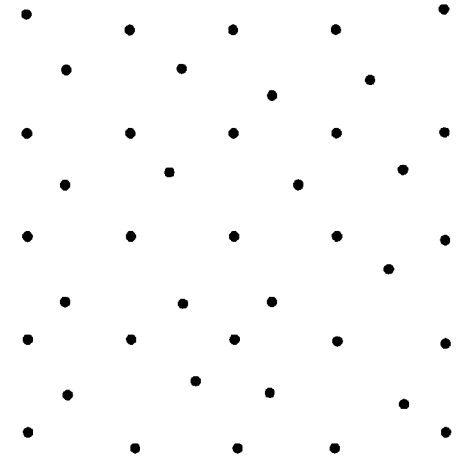

It should be noted that, while grid lines that connect reference dots 4 are expressed as solid lines in the dot pattern of FIG. 18A for convenience of explanation, such solid lines do not exist in the actual dot pattern as shown in the dot pattern shown in FIG. 18B.

Here, the information dot of the dot pattern 1 can be arranged in four directions, and the information amount that a circle area expressed by the dotted line that includes one information dot is two bits.

If this dot pattern 1 is read out by a scanner, the dot pattern 1 is analyzed by the central processing unit and converted into the dot code 12 from C0 to C31.

FIGS. 18C, 18D, 18E, and 18F show dot code formats for one block of the dot pattern 1 that constitutes a set of information dots.

Figure 18C:
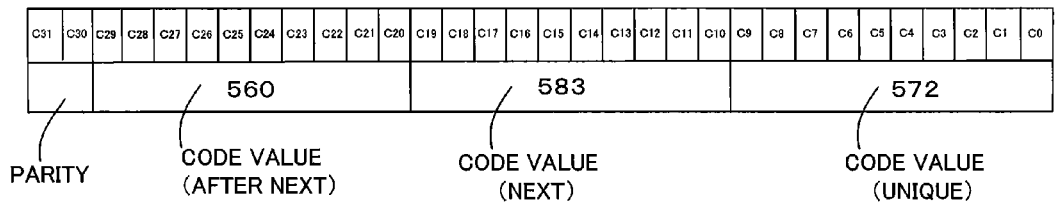

The dot code in FIG. 18C defines parity check and a code value. It should be noted that the dot code may define X and Y coordinate values instead of the code value or define X and Y coordinate values in addition to the code value.

The dot code in FIG. 18C defines a code value (572) associated with content data that is output first after reading the printed area on which a dot pattern is formed by a scanner, as well as defines code values (583, 560) associated with other content data.

The central processing unit that analyzed this dot code refers to a link table and, first, instructs outputting of content data associated with the code value 572.

Then, the central processing unit instructs to continuously output content data that is defined by the same dot code and associated with other code value 583.

Further, as other code value 583 still remains in the same dot code, the central processing unit instructs to continuously output content data associated with the code value 583.

While content data associated with code values in the order of the code values 572, 583, 560 is output in this example, content data associated with code values in the order of 560, 572, 583 may also be output, or the number of code values defined by one dot code may be defined as two or four or more and the number of content data to be continuously output may be appropriately increased or decreased.

Also, plurality pieces of content data may be associated with one code value in the link table. In such a case, after outputting all content data associated with one code value, content data associated with the next code value is instructed to be output.

It should be noted that whether continuously outputting content data or outputting only content data associated with a predetermined code value may be switched by the output mode.

Also, for example, a dot pattern having a unique code value that is different for each photograph may be formed on a printed medium on which photographs superimposed and printed with several dot patterns are separately printed, or a dot pattern having a unique code value that is different for each range may be formed by partitioning a printed medium on which dot patterns are superimposed and printed over the entire surface into predetermined ranges.

Figure 18D:
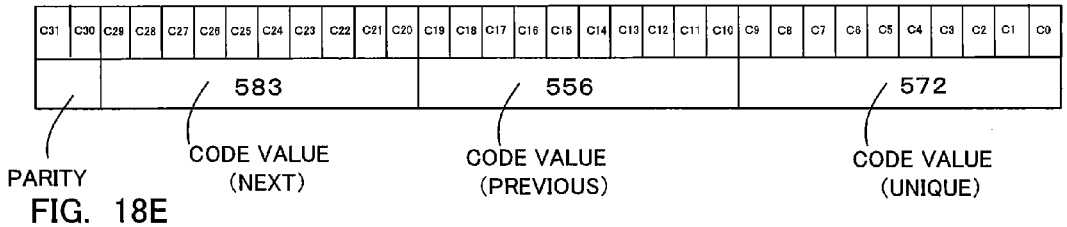

The dot code in FIG. 18D indicates a code value (572) for indicating association with predetermined content data, as well as defines code values (556, 583) for indicating association with other content data.

These three code values are a code value (572) associated with content data being output at present, a code value (583) associated with content data to be output next, and a code value (556) associated with content data to have been previously output before the presently outputting content data.

When the dot pattern is imaged by the scanner, the central processing unit instructs to analyze the dot pattern, convert into a dot code, refer to the link table, read out content data associated with a code value (572) unique to the dot code from a storage unit such as a hard disk, and output from an output unit.

Also, in addition to the instruction of outputting the content data, the central processing unit instructs to refer to a dot code format, check a code value (583) associated with content data to be output next, and, after outputting content data that is being output at present, output content data associated with the next code value (583).

Also, by defining the previous code value in addition to the unique code value and the next code value by a dot code as shown in FIG. 18C, content data can be easily reproduced in a reverse order by switching the playback mode.

To reproduce content data in a reverse playback mode, as in the method of continuously outputting normal content data as described above, the previous code value may be checked along with the instruction of outputting content data associated with the unique code value, and content data associated with the previous code may be output.

As shown in FIG. 18D, the code value associated with content data to be output after the content data that is output first can also be expressed by a difference value from a code value associated with the content data that is output first in the dot code format.

Figure 18E:
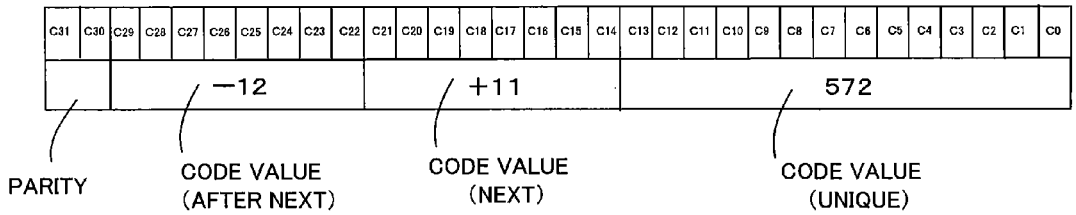
Figure 18F:
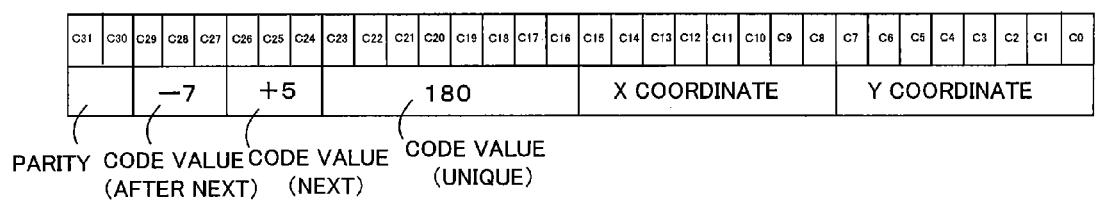

That is, as shown in FIG. 18E, when a code value associated with the content data that is output first is 572 and the next code value is 583, the next code value 583 can be expressed by adding 11 to the code value 572 that is the code value associated with the content data that is output first. Similarly, a code value after the next 560 can be expressed by subtracting 4. By defining a code value to be continuously output using a difference, the range of code values can be increased and a lot of content data can be dealt with. Also, coordinate values and the like can be defined at the increased area and dealt with.

The following describes the third method of outputting content data.

FIGS. 19A and 19B are explanatory diagrams showing an example of a dot code format and a dot code-linking table.

Even if there is only one code value for indicating association with a content file in one dot code as in the dot code illustrated in FIG. 19A, content data can be continuously output by providing a dot code linking table as shown in FIG. 19B.

That is, after analyzing the dot pattern and converting into a dot code, the central processing unit instructs to refer to a link table, read out a content file associated with the dot code from a storage medium such as a hard disk and output.

Next, it is possible to instruct to refer to a dot code-linking table, check a dot code registered by being associated with the dot code in the dot code-linking table, and continuously output content data associated with the dot code. In the above procedure, it is possible to instruct to refer to a dot code linking table first, store a dot code to be continuously output, then, in that order, refer to a dot code linking table, and continuously output content data associated with the dot code.

As described above, in a case in which content data is continuously output according to linking of the dot code, the order of continuous output of content data can be easily changed by changing association between a code value and X and Y coordinate values defined by a dot code and content data in a link table and changing a dot code linking table.

The following describes the fourth method of continuously outputting content data that is registered by being associated with dot codes.

FIG. 20A is a drawing showing an example of a link table that associates and registers code values and the file names of content files, and a content file that stores the file names and content data. The content data is stored in the content file, and the link table makes clear where the content data exists by associating the code values with the content file names.

In FIG. 20A, each content file stores both a content file name that has been previously output and a content file name to be output next.

In this way, by connecting files and using as instruction information for indicating content data that is output after the content data that is being output at present, next content data can be continuously output after completing output of the present content data.

Also, it is possible to also store a content file name that stores content data that has been output before the content data that is being output at present in a content file. In this way, continuous output of content data in a reverse playback mode becomes easy.

Also, as illustrated in FIG. 20B, by providing a number (an index) to each content file in an index table, the file name of the other content information can be registered using the number.

The following describes the fifth method of continuously outputting content data associated with dot codes.

In FIG. 21A, code values are listed in an ascending order in the link table and the file names of the content files are associated with these code values and registered.

Also, a range in which content data is continuously output (continuous output range) is determined in advance and stored in the storage unit. It should be noted that, in FIG. 21A, the continuous output range is code values 200 to 203.

In such a case, continuous output can be realized by outputting content data associated with dot codes in the ascending order of the dot codes.

Content data associated with code values within the continuous output range may be continuously output in an ascending order or a descending order of the code values according to a predetermined instruction from content data associated with a code value of a dot code that is read out first in the continuous output range.

Also, to reproduce the content data in a reverse order in such a case in which dot codes are listed in the ascending order, the content data may be output in the descending order of the dot code. It should be noted that, when code values are listed in the descending order according to a predetermined instruction, the content data may be reproduced normally, or, when code values are listed in the ascending order, the content data may be reproduced in a reverse order.

When outputting of the content data within the preset continuous output range ends, continuous output of the content data ends.

Also, if a plurality of file names are associated with one code value and registered, after outputting all content data associated with the code value, content data associated with the next code value may be output.

FIG. 22 shows a drawing in which code values listed in an ascending order are associated with a variety of contents such as sound contents, URL contents, and motion picture contents.

In such a case, if content data is continuously output according to the ascending order of the code values, after outputting a sound content, content data of different property is continuously output, such as displaying an URL of a web site and increasing the sound volume. Therefore, only the content of the same property (only sound contents, only motion picture contents) may be extracted and continuously output according to a predetermined instruction.

The following describes linking of content data and dot codes.

FIGS. 23A and 23B show content files that store content data and file names and link tables that associate and register code values defined by dot codes and the content file names.

In the link table of FIG. 23A, a space for registering a content file name or an address is defined as a registering space.

The content data and a dot code can be linked in the registering space by registering the file name or address of a content file that stores content data recorded in the storage unit.

As shown in FIG. 23B, even if a code value and the file name or address of a content file have already been associated and registered, file names or addresses of a plurality of content files may also be associated and registered for the one code value.

Figure 24:
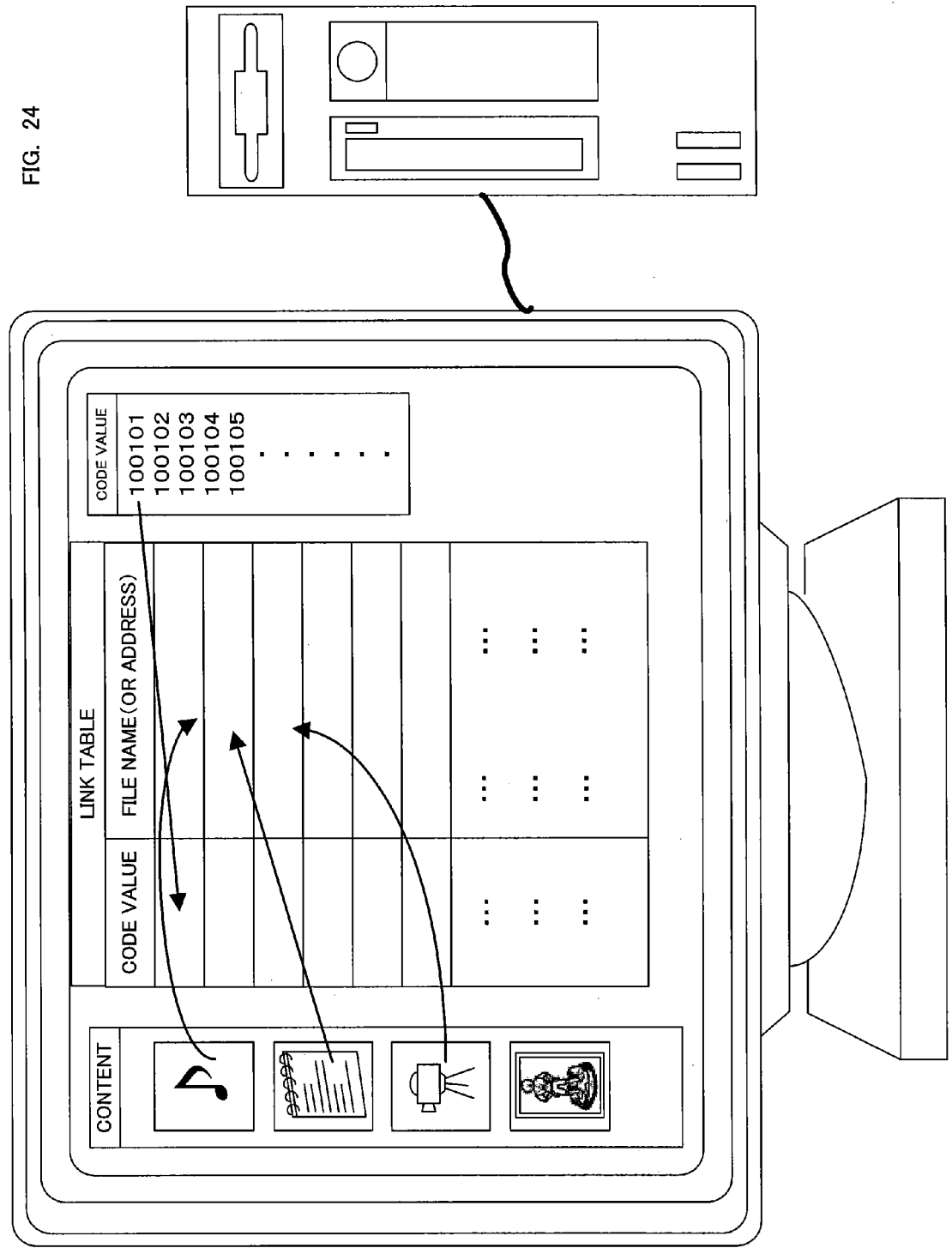
FIG. 24 is an explanatory diagram of an application executed for preparing a link table on a personal computer.
Figure 25:
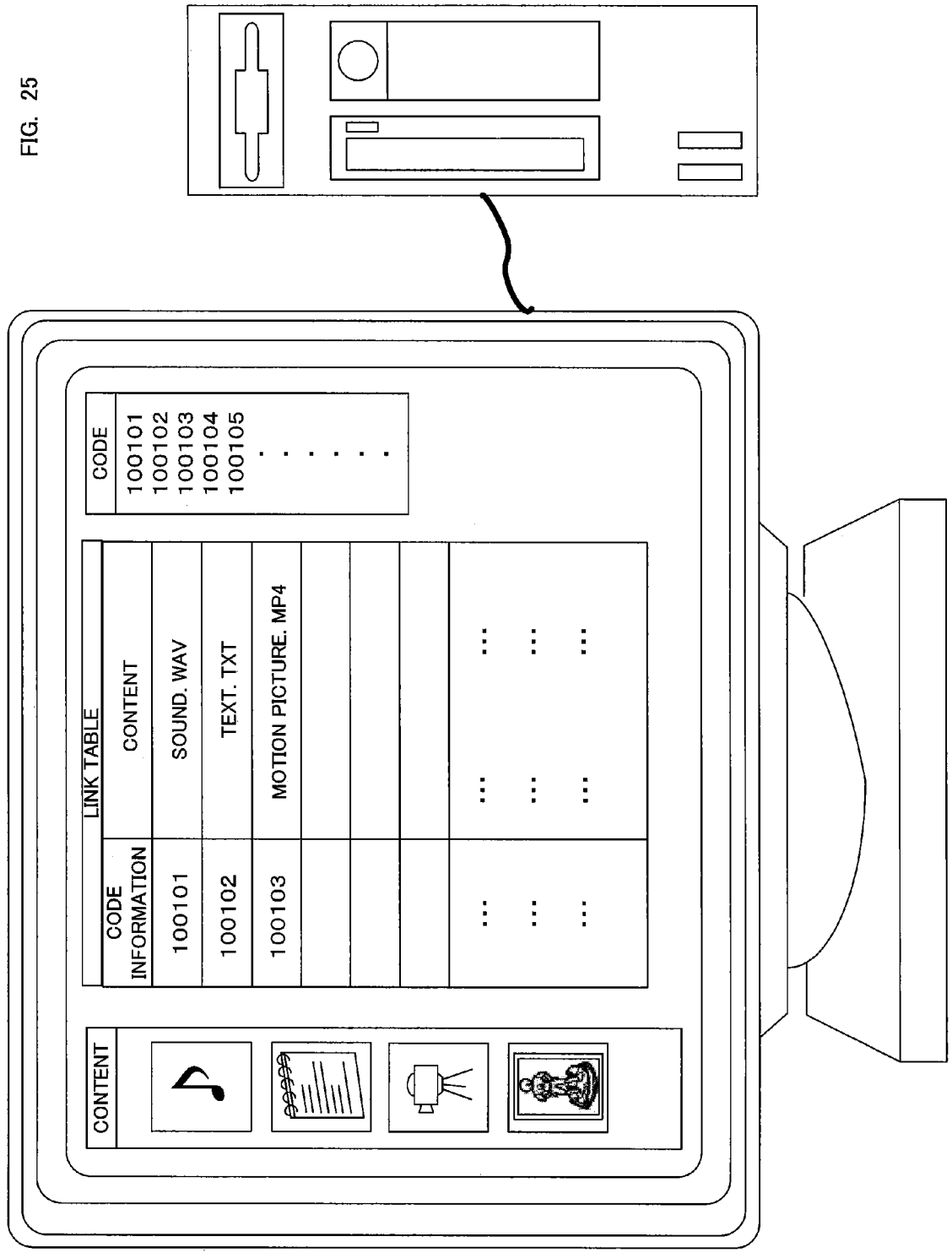
FIG. 25 is an explanatory diagram of an application executed for preparing a link table on a personal computer.

FIGS. 24 and 25 illustrate an application, executed on a personal computer, for creating the above described link table. FIG. 24 is a drawing for showing how the application runs, and FIG. 25 is a drawing for showing a link table created by execution of the application.

As shown in FIG. 24, if the application for creating a link table is activated, icons that display respective content data stored in the computer in advance are displayed on the left side of the screen on the display device, code values are displayed on the right side of the screen, and the link table is displayed in the middle of the screen. A user operates a mouse, which is not shown, to insert the displayed content data or code value into the link table in the middle of the screen by dragging and dropping.

It should be noted that, when inserting a code value into a code value field, if a code value of the minimum value is inserted in the lead, the other code values may be automatically inserted in an ascending order from the code value.

Then, as shown in FIG. 25, the link table in the middle of the screen registers association between new contents and dot codes, displays the dot codes in the code value fields, and displays file names of the contents in the content fields.

In this way, the link table can be created even on a personal computer using a dedicated application.

(Specifying the Range of Outputting Contents)

Figure 26:
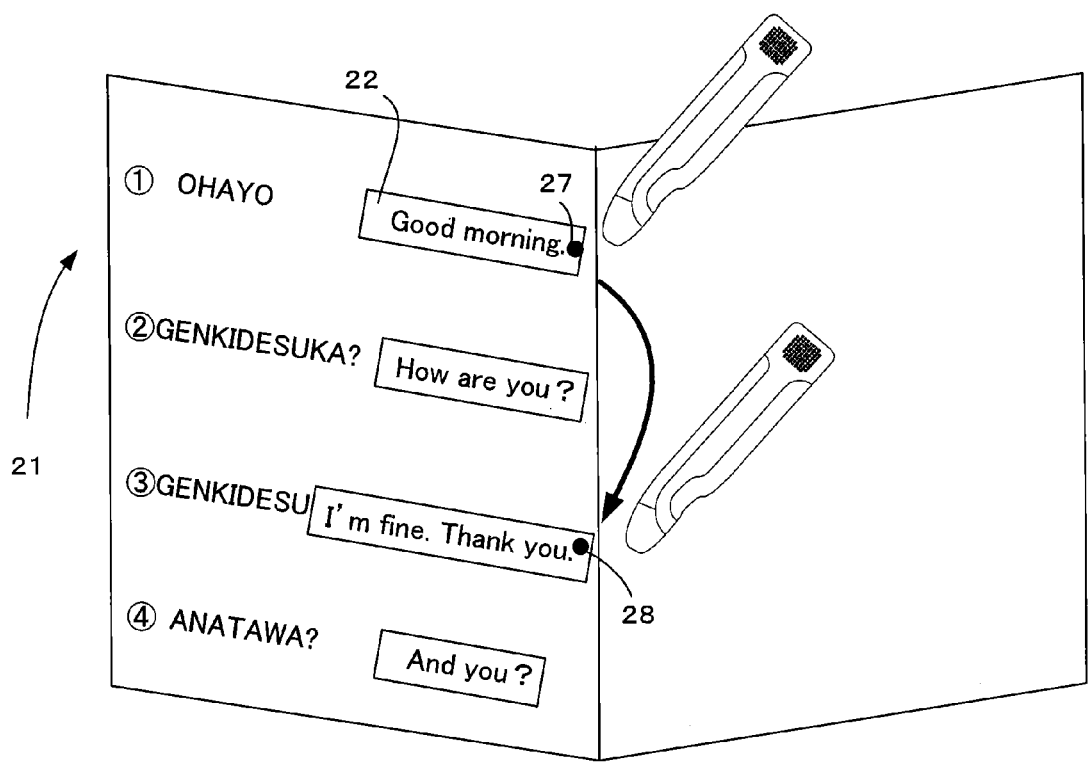
FIG. 26 is an explanatory diagram of a method for specifying a range of content data to be continuously output.

FIG. 26 is a drawing for illustrating a method of specifying a range of continuously outputting content data.

In FIG. 26, a dot code signified by the dot pattern formed in the printed area 22 on the printed medium 21 defines a code value, and the content data registered by being associated with the code value is continuously output by any one of above-described methods.

The following describes a case in which content data is continuously output when the above dot code defines a code value for indicating association with predetermined content data, as well as, a code value for indicating association with other content data. In such a case, the dot code defines four code values and the code values are instruction information for continuously outputting content data "Good morning," "How are you," "I'm fine. Thank you." and "And you?" in this order.

If an area where a text "Good morning" shown in FIG. 26 and a dot pattern are superimposed and printed is first imaged by the optical reading unit, the start point detecting unit recognizes the imaged point as the start point. It should be noted that even if an area where a dot pattern is not formed is imaged first, it is not recognized as the start point. Also, even if a dot pattern is formed, if the dot code signified by the dot pattern is not associated with content data, the imaged point is not recognized as the start point.

Next, if "I'm fine. Thank you." shown in FIG. 26 is imaged by the optical reading unit, the end point detecting unit recognizes the imaged point as the end point.

There are following two methods for detecting an end point.

First, there is a method that images a dot pattern by an optical reading unit, after detecting the start point by the start point detecting unit, detaches the optical reading unit from the printed medium once, and, when the dot pattern is imaged again by the optical reading unit, detects a point obtained by imaging the dot pattern in the second time as an end point.

Also, there is a method that images a dot pattern by an optical reading unit, after detecting the start point by the start point detecting unit, keeps imaging the dot pattern without detaching the optical reading unit from the printed medium, slides the optical reading unit to a point desired to be the end point, and detaches the optical reading unit from the printed medium, then, detects the point which dot pattern is imaged by the optical reading unit at last as the end point.

Here, the central processing unit instructs to analyze a dot pattern detected as the start point, convert the dot pattern into the dot code, extract a code value for indicating association with the predetermined content data from the converted dot code, refer to the link table, and output content data ("Good morning") associated with the code value.

Also, the central processing unit instructs to extract a code value for indicating association with content data to be output next from the dot code, and output content data ("How are you?") registered by being associated with the next code value after the content data being output at present.

This is repeated until the content data ("I'm fine. Thank you.") associated with the dot pattern recognized as the end point is completely output.

Such a step of continuously outputting content data from starting outputting content data at the start point until completing outputting content data at the end point is possible in a similar way in any cases in which: content data is continuously output when dot codes are linked in the dot code linking table; content data is continuously output when content files are linked; and content data is continuously output in the descending order or ascending order of code values defined by the dot code.

FIGS. 27A to 27E are drawings for illustrating a method of specifying a range of continuously outputting content data that is associated and registered with X and Y coordinate values when the dot code signified by the dot pattern formed in the printed area 22 on a printed medium surface defines at least the X and Y coordinate values.

In the link tables shown in FIGS. 27A and 27B, for example, X and Y coordinate values on a printed medium surface are associated with content data such as a sound, a still image, a motion picture, an operation instruction, and the like corresponding to the X and Y coordinates on the printed medium surface.

First of all, when a printed area 22 shown in FIG. 27B is read out by the optical reading unit, the start point detecting unit recognizes the imaged point as the start point. Then, when the dot pattern of the printed area 22 is read out by the optical reading unit, the end point detecting unit recognizes the imaged point as the end point. There are two patterns of methods for detecting this end point as described above.

There are the following two patterns of methods for specifying a range for continuously outputting content data associated with X and Y coordinate values that are obtained as described above.

First, as for the first method, as shown in FIG. 27A, in the first method, a representative point of X and Y coordinates and content data are associated in the link table. For example, if a dot pattern is superimposed and printed on a text, the X and Y coordinates of the first letter on the printed medium surface may be registered in the link table as a representative point of the text. It should be noted that, while the representative point of the predetermined word or text may be X and Y coordinates of a position other than the first letter, such as the center of the text, if the first letter is used and a dot pattern nearby the first letter is read out and converted into a dot code in a mode in which continuous output is not performed, only a text that is within a predetermined radius with the read X and Y coordinates as the center and has a representative point closest to the center is reproduced.

The central processing unit recognizes analysis processing of images at the read start point and end point portions (dot patterns), and obtains coordinate information (X and Y coordinate values) by executing processing of converting into code information or X and Y coordinate values.

Then, the central processing unit refers to the link table of FIG. 27A using the X and Y coordinate values and outputs content data associated with X and Y coordinate values closest to the X and Y coordinate values of the start point portion.

Also, the central processing unit calculates a rectangular area that has a straight line connecting the start point and the end point as a diagonal line based on the X and Y coordinate values of the calculated start point and end point. Then, the central processing unit calculates X and Y coordinate values included in the rectangular area by calculation, refers to the coordinate information link table of FIG. 37A using the X and Y coordinate values, and continuously outputs content data registered by being associated with the X and Y coordinate values included in the rectangular area. Here, in a horizontal written text or horizontally arranged graphics, a representative point having a Y coordinate value that is closest to the start point is first selected among X and Y coordinate values that define representative points, if there are a plurality of representative points having the Y coordinate value, content data is continuously output in the order from content data registered by being associated with a representative point on the Y coordinate and having an X coordinate value closest to the start point to content data registered by being associated with a representative point having an X coordinate value farthest from the start point within the rectangular area. Then, a representative point having a Y coordinate value secondly closest to the start point is selected within the rectangular area and the same processing is sequentially performed. It should be noted that, in a vertical writing, representative points are searched by exchanging X and Y to continuously output content data.

Alternatively, the order of continuously outputting content data may be an ascending order or a descending order of X and Y coordinates registered in the link table. If a code value for indicating association with content data at the start point portion and a code value for indicating association with other content data are defined by a dot code in addition to X and Y coordinate values, the order of outputting content data can be determined by defining the code value for indicating association with the other content data as instruction information for indicating content data to be output next. A dot code-linking table may also be referred to if it is stored in the storage unit. Also, other content file name is registered in a content file that stores content data, and which constitutes instruction information for indicating content data to be output next, the order of outputting content data can be determined according to this. Also, if a dot code defines a code value as well as X and Y coordinates, the order of outputting content data can be determined according to the descending or ascending order of the code values.

Also, as means to end continuous outputting of content data, continuous output of content data may end when completing outputting of content data registered by being associated with X and Y coordinate values closest to the X and Y coordinate values at the end point portion, continuous output of content data may end when completing outputting of content data registered by being associated with X and Y coordinate values, for example, closest to the X and Y coordinate values at a lower right portion of the rectangular area among X and Y coordinate values included in the rectangular area, or continuous output of content data may end when completing outputting of all content data registered by being associated with X and Y coordinate values included in the rectangular area.

The following describes a second method of specifying a range of continuously outputting content data that is associated with X and Y coordinate values.

As shown in FIG. 27E, a rectangle is formed to enclose predetermined words, texts, and graphics and is indicated by minimum values $X_{min}, Y_{min}$ and maximum values $X_{max}, Y_{max}$ among X and Y coordinate values in the rectangle, and the content data is registered in the link table by being associated with the minimum values and the maximum values. When the dot pattern in the rectangle is read out and converted into X and Y coordinate values by the optical reading unit, to which rectangle the X and Y coordinate values converted by referring to the link table belongs is determined based on the minimum and maximum values, and associated content data is output. In this way, content data housed in a rectangular area having a straight line connecting the start point and the end point as a diagonal line and associated with the rectangle indicated by the minimum and maximum values are continuously output. Even if part of the rectangle indicated by the minimum and maximum values is housed in the rectangular area, associated content data may be continuously output. Also, by arbitrary determining a representative point of a rectangle indicated by the minimum and maximum values, the order of continuously outputting content data may be determined in relation to the position of the representative point, or may be determined by the above described other methods.

(Printed Medium and Side Readers)

FIG. 1B is a diagram illustrating a printed medium on which dot patterns are superimposed and printed with texts, figures, symbols and/or photographs/illustrations (such as pictorial symbols).

The printed area 22 is superimposed and printed with a dot pattern 1 that arranges dots based on a predetermined rule and defines a code value and/or a coordinate value. When the dot pattern 1 is read out by the optical reading unit 24 of the information input/output device 23, the dot pattern is analyzed by a processing unit in the information input/output device 23, and converted into a dot code that defines a code value and/or a coordinate value.

Also, the link table stored in the storage unit of the information input/output device 23 associates and registers the dot code and two or more pieces of content data. The control unit of the information input/output device 23 instructs to refer to the link table using the dot code and continuously output the two or more pieces of content data to the output unit 25.

Then, the two or more pieces of content data associated with the dot code are read out from the storage unit so that the content data is continuously output.

Here, any one of the above-described methods may be used as a method for continuously outputting content data.

Also, the dot pattern formed in a printed area of the printed medium 21 may be any one of above described GRID1, GRID3, and stream dot pattern, or may be any other dot patterns that are not described.

Further, if the information input/output device 23 is connected wiredly or wirelessly with the information processing device of a personal computer or the like, the content data may be output from the output unit of the information processing device.

Figure 29A:
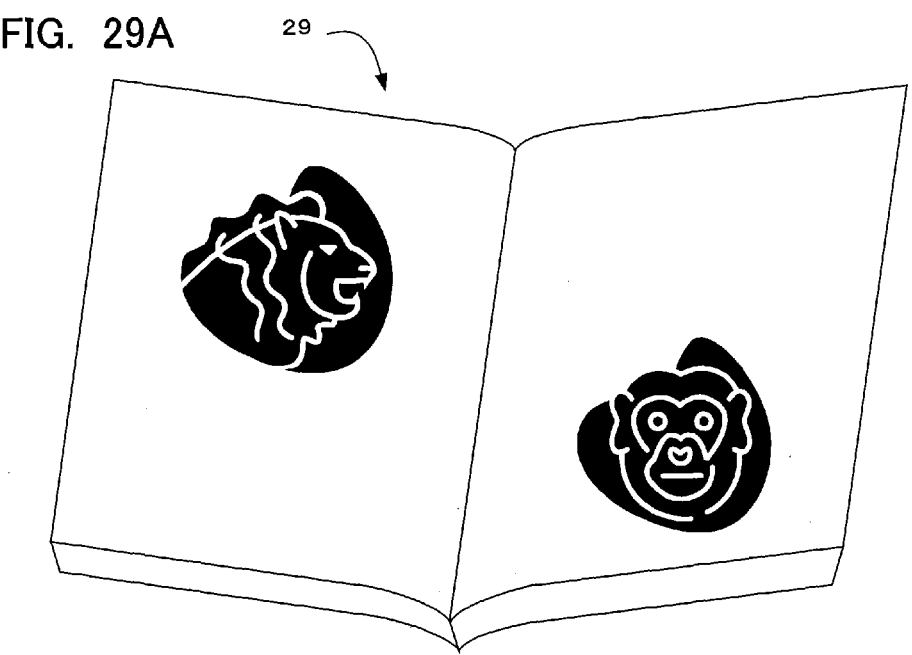
FIGS. 29A to 29C are explanatory diagrams showing an example of a main reader and side readers.
Figure 29B:
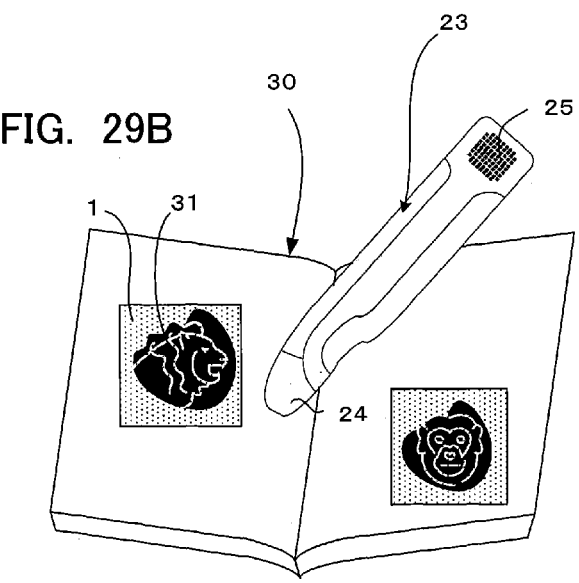
Figure 29C:
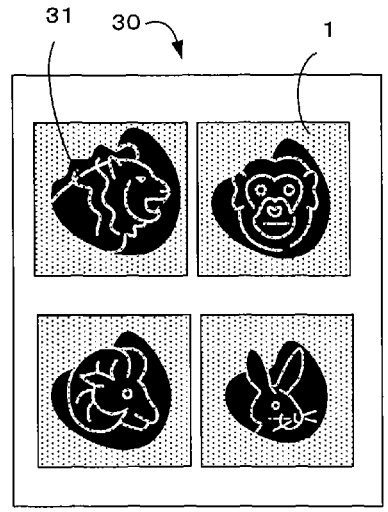

FIGS. 29A to 29C are diagrams for illustrating a main reader and a side reader of the invention.

FIG. 29A shows a picture book that is printed with pictures of animals but not printed with a dot pattern as a main reader. When creating a picture book as a main reader, a normal picture book may be created without a special step. Thus, picture books that have already published may also be used.

FIG. 29B shows a side reader of a booklet shape on which is printed an index 31 for the main reader, and the index 31 is superimposed and printed with a dot pattern 1. Also, FIG. 29C shows a case in which a piece of sheet is used as a side reader for the main reader.

Here, the main reader refers to a variety of printed media such as a novel, a picture book, a magazine, a text book, a dictionary, a bible, and a photo book, and the side reader refers to a printed medium that has a use purpose of accompanying the main reader, such as a booklet, a card, a bookmark, a sticker, and a foldable printed medium. Also, if the side reader is a shape and a size that can be slipped or enclosed in the main reader, the side reader can be attached as an appendix to the main reader. It should be noted that print data including a dot pattern can be transmitted via the Internet and output by a printer.

Also, a side reader can be made by contracting the main reader as is to make a printed medium and adding dot patterns thereto.

The indexes printed on the side readers in FIGS. 29B and 29C are animal drawing patterns, and are indexes corresponding to the content of the main reader.

When dot patterns superimposed and printed with these indexes are read out by the information input/output device 23, the content data corresponding to the content of the main reader is output.

For example, if the index of the drawing pattern of a monkey in the side reader is read out, the squeaking of the monkey and description on the biology of the monkey are output as a sound.

Such content data can be continuously output using any one of the above methods. It should be noted that, while it is not described, coordinates can be superimposed and printed over the entire surface of the above side reader, and depending on which part of each table of contents is read, continuous output can be started from a character associated with the coordinates or from the middle of the text.

Also, the dot pattern formed in a printed area of the printed medium 21 may be any of the above described GRID1, GRID3, and stream dot pattern, or any other dot patterns that are not described.

Further, if the information input/output device 23 is wiredly or wirelessly connected to the information processing device of a personal computer and the like, the content data may be output by the output unit of the information processing device.

Figure 30A:
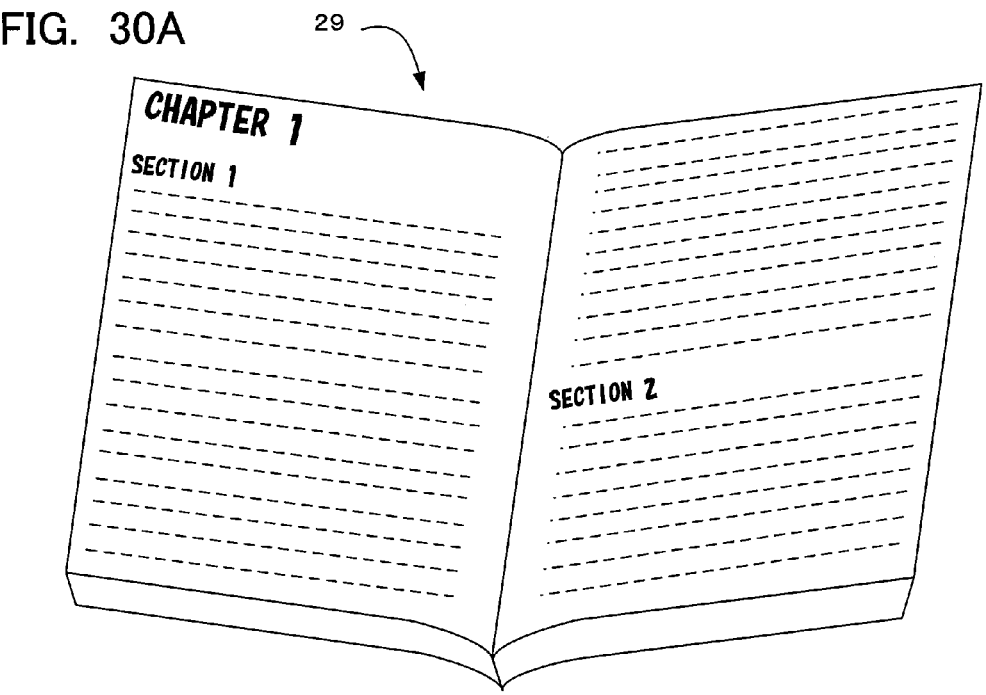
FIGS. 30A to 30C are explanatory diagrams showing an example of a main reader and side readers.
Figure 30B:
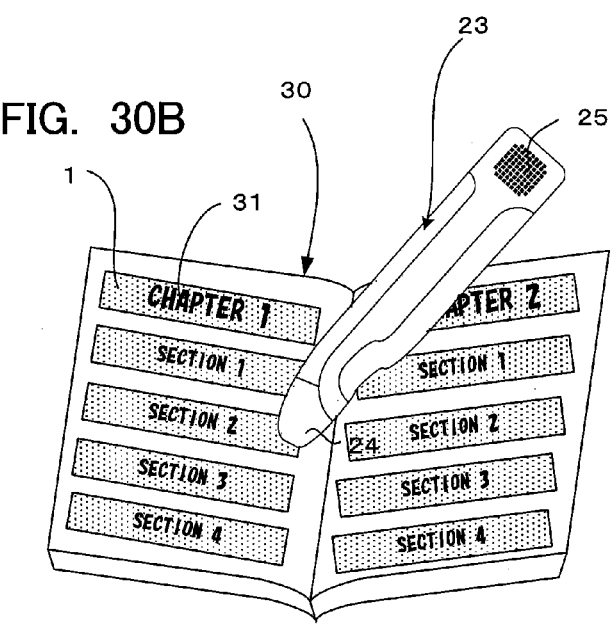
Figure 30C:
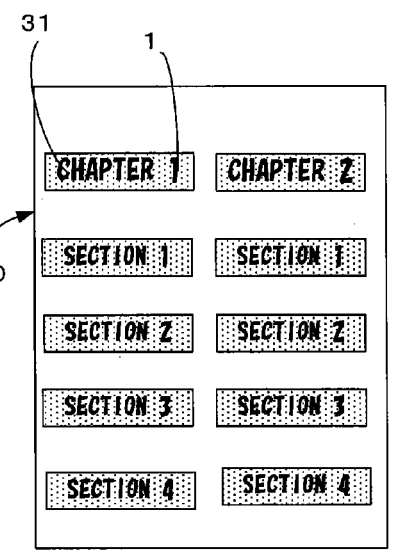

FIGS. 30A to 30C are drawings showing a main reader (FIG. 30A) that describes texts of a novel or the like, and side readers of a booklet shape (FIG. 30B) and a piece of sheet (FIG. 30C) therefor.

Content information corresponding to the content of the main reader is continuously output using any one of the above methods by reading the dot pattern 1 formed on the index 31 of the side reader using the information input/output device 23.

For example, when a dot pattern on an index indicating "Chapter 1" of the side reader shown in FIGS. 30B and 30C is read out, content data corresponding to the content from "Section 1" to "Section 4" described in "Chapter 1" of the main reader may be continuously output.

Also, when a dot pattern on an index indicating "Section 3" of the side reader is read out, content data corresponding to the content from "Section 3" to "Section 4" of the main reader may be continuously output. Also, by switching modes, only content data corresponding to the content of "Section 3" of the main reader may be output and the content of "Section 4" may not be continuously output. It should be noted that, while not described in the drawings, coordinates may be superimposed and printed over the entire surface of the side readers and, depending on the read position of the table of content, continuous output can be done from the middle of the chapter or section associated with the coordinates.

It should be noted that if the information input/output device 23 is connected wiredly or wirelessly with the information processing device of a personal computer or the like, the content data may be output by the output unit of the information processing device.

INDUSTRIAL APPLICABILITY

The invention can be used for a use purpose for freely outputting information in a dot pattern formed on a printed medium that has content data that is effectively continuously output, for example a novel, an English conversation text, or a booklet or a side reader that describes the indexes thereof and inserted as appendices thereto. Also, not only reproducing arbitrary words for language study or from a script, but also a text following the words can be reproduced. Further, content recorded during a meeting by a record function can be stored in a content file by being classified into time, themes, and speakers, and the association can be registered in a variety of link tables, whereby continuous output thereof is made possible.

DESCRIPTION OF REFERENCE NUMERALS AND SIGNS

1 DOT PATTERN
2 KEY DOT
3 INFORMATION DOT
4 REFERENCE DOT
5 VIRTUAL REFERENCE DOT
6 FIRST VIRTUAL REFERENCE LINE
7 SECOND VIRTUAL REFERENCE LINE
8 THIRD VIRTUAL REFERENCE LINE
9 FOURTH VIRTUAL REFERENCE LINE
10 SIDE DOT
11 DOT CODE FORMAT
12 DOT CODE
13 CODE VALUE
14 REFERENCE GRID POINT DOT
15 VIRTUAL REFERENCE GRID POINT
16 REFERENCE GRID LINE
17 GRID LINE
18 VIRTUAL GRID LINE
21 PRINTED MEDIUM
22 PRINTED AREA
23 INFORMATION INPUT/OUTPUT DEVICE
24 OPTICAL READING UNIT
25 OUTPUT UNIT
26 RECORD BUTTON
27 START POINT
28 END POINT
29 MAIN READER
30 SIDE READER
31 INDEX

The invention claimed is:

1. An information input/output device comprising:
an optical reading unit for reading a dot pattern formed on a medium surface;
a processing unit for analyzing the dot pattern from image data of the dot pattern read out by the optical reading unit and converting the dot pattern into a dot code that defines a code value and/or a coordinate value;
a storage unit for storing content data and a link table that associates and registers the dot code and the content data;
an output unit for reading the content data associated with the dot code that is converted by the processing unit from the storage unit and outputting the content data; and
a control unit for controlling operation of the optical reading unit, the processing unit, and the output unit,
wherein the link table stored in the storage unit associates and registers at least two pieces of content data and the dot code, the control unit instructs to refer to the link table using the dot code and continuously output the at least two pieces of content data, and the output unit continuously outputs the content data at least twice according to the instruction.

2. The information input/output device according to claim 1, wherein:
the link table stored in the storage unit associates and registers at least one piece of content data and the dot code, instead of the at least two pieces of content data,
the processing unit analyzes the dot pattern and converts the dot pattern into a dot code that defines a code value and/or a coordinate value for indicating association with at least one piece of other content data in addition to a code value and/or a coordinate value for indicating association with predetermined content data that is output first, and
the control unit instructs to refer to the link table using the code value and/or coordinate value defined by the dot code and continuously output the predetermined content data that is output first and the at least one piece of other content data.

3. The information input/output device according to claim 2, wherein
the processing unit analyzes the dot pattern indicated by a difference value from a code value and/or a coordinate value for indicating association with the predetermined content data that is output first, and
converts the dot pattern into a dot code that defines a code value and/or a coordinate value for indicating association with at least one piece of other content data in addition to a code value and/or a coordinate value for indicating association with the predetermined content data that is output first.

4. The information input/output device according to claim 1, wherein
the link table stored in the storage unit associates and registers at least one piece of content data and the dot code instead of the at least two pieces of content data,
the storage unit stores a dot code linking table that associates and registers a predetermined dot code and at least one other dot code, and
the control unit instructs to refer to the link table using the predetermined dot code converted by the processing unit and output content data registered in the link table by being associated with the predetermined dot code, as well as instructs to refer to the dot code linking table and continuously output content data registered in the link table by being associated with the other dot code that is associated and registered with the predetermined dot code in the dot code linking table.

5. The information input/output device according to claim 1, wherein
the link table stored in the storage unit associates and registers at least one piece of content data and the dot code, instead of the at least two pieces of content data, content data to be continuously output is registered by being associated with a dot code of an ascending order or a descending order, the storage unit further stores a continuous output range of dot codes that is associated with content data to be continuously output, and the control unit refers to the continuous output range using a dot code converted by the processing unit, and, if the dot code is within the continuous output range, instructs to refer to the link table and, starting from the content data that is registered in the link table by being associated with the dot code, continuously output the content data that is registered in the link table by being associated with dot codes of an ascending order or a descending order within the continuous output range.

6. The information input/output device according to claim 1, wherein the link table stored in the storage unit associates and registers at least one piece of content data and the dot code instead of the at least two pieces of content data, the storage unit stores the content data by recording the content data and a file name in a content file, the content file stores a file name for indicating at least one other content file as well as a file name that is unique to the content file, and the control unit instructs to refer to the link table using the dot code converted by the processing unit and output content data that is registered in the link table by being associated with the dot code, as well as instructs to refer to a file name for indicating another content file stored in the content file and continuously output data of a content stored in the another content file.

7. The information input/output device according to claim 1, further comprising:

a start point detecting unit that firstly detects a start point when an optical reading unit reads a dot pattern that defines a dot code; and an end point detecting unit that secondly detects an end point when the optical reading unit reads the dot pattern that defines the dot code, wherein the control unit instructs to continuously output only the content data stored in the link table by being associated with the dot code from the start point to the end point.

8. The information input/output device according to claim 7, wherein the dot code defines at least X and Y coordinate values, and the control unit instructs to continuously output only the content information that is stored in a link table by being associated with a code value and/or X and Y coordinate values signified by a dot code defined by a dot pattern included in a predetermined rectangular area having a diagonal line connecting the start point and the end point detected by the start point detecting unit and the end point detecting unit.

9. An information processing device comprising:

a receiving unit that receives a dot code from an information input device that comprises an optical reading unit that reads a dot pattern formed on a medium surface, a processing unit that analyzes the dot pattern from image data of the dot pattern read out by the optical reading unit and converts the dot pattern into a dot code that defines a code value and/or a coordinate value, and a transmitting unit that transmits the dot code to the information processing device;

a storage unit that stores content data and a link table that associates and registers the dot code and the content data;

an output unit that reads out the content data that is associated with the dot code converted by the processing unit from the storage unit and outputs the content data; and a control unit that controls operation of the optical reading unit, the processing unit, the transmitting unit, the receiving unit, and the output unit, wherein the link table stored in the storage unit associates and registers at least two pieces of content data and the dot code, the control unit instructs to refer to the link table using the dot code and continuously output the at least two pieces of content data, and the output unit continuously outputs the content data at least twice according to the instruction.

10. An information processing device comprising:

a receiving unit that receives the image data from an information input device that comprises an optical reading unit that reads a dot pattern formed on a medium surface and a transmitting unit that transmits image data of the dot pattern read out by the optical reading unit to the information processing device;

a processing unit that analyzes the dot pattern from the image data received from the information input device and converts the dot pattern into a dot code that defines a code value and/or a coordinate value;

a storage unit that stores content data and a link table that associates and registers the dot code and the content data;

an output unit that reads out the content data that is associated with the dot code converted by the processing unit from the storage unit and outputs the content data; and a control unit that controls operation of the optical reading unit, the transmitting unit, the receiving unit, the processing unit and the output unit, wherein the link table stored in the storage unit associates and registers at least two pieces of content data and the dot code, the control unit instructs to refer to the link table using the dot code and continuously output the at least two pieces of content data, and the output unit continuously outputs the content data at least twice according to the instruction.

11. An information input/output system comprising:

an information input device that comprises an optical reading unit that reads a dot pattern formed on a medium surface, a processing unit that analyzes the dot pattern from image data of the dot pattern read out by the optical reading unit and converts the dot pattern into a dot code that defines a code value and/or a coordinate value, and a transmitting unit that transmits the dot code to an information processing device; and an information processing device that comprises a receiving unit that receives the dot code, a storage unit that stores content data and a link table that associates and registers the dot code and the content data, an output unit that reads out the content data associated with the dot code converted by the processing unit from the storage unit and outputs the content data, and a control unit that controls operation of the optical reading unit, the processing unit, the transmitting unit, the receiving unit, and the output unit, wherein the link table stored in the storage unit of the information processing device associates and registers at least two pieces of content data and the dot code, the control unit of the information processing device instructs to refer to the link table using the dot code and continuously output the at least two pieces of content data, and the output unit of the information processing device continuously outputs the content data at least twice according to the instruction.

12. A printed medium on which a dot pattern that arranges dots based on a predetermined rule and defines a code value and/or a coordinate value is superimposed and printed with a text, a figure, a symbol and/or a photograph (hereafter referred to as the text, etc.), the printed medium being used for outputting content data that is associated with a dot code signified by the dot pattern and stored in a storage unit of an information input/output device from an output unit of the information input/output device when an optical reading unit of the information input/output device reads the dot pattern, wherein:

the printed medium has a printed area printed with the text, etc.;

the printed area is superimposed and printed with a dot pattern respectively signifying a different dot code;

when the dot pattern is analyzed by a processing unit of the information input/output device, the dot pattern is converted into a dot code that defines a code value and/or a coordinate value;

the dot code is registered in a link table stored in the storage unit of the information processing device by being associated with at least two pieces of content data;

a control unit of the information processing device instructs to refer to the link table using the dot code and continuously output the at least two pieces of content data; and an output unit of the information processing device continuously outputs the content data at least twice according to the instruction.

13. The printed medium according to claim 12, wherein the printed medium is superimposed and printed with the dot pattern and a text, etc., by:

continuously arranging a plurality of reference dots in a line in accordance with a predetermined rule on a printed medium;

providing a first virtual reference line comprising a straight line, a polygonal line and/or a curved line that connects the plurality of reference dots;

providing a second virtual reference line that is defined at a predetermined position from the reference dots and/or the first virtual reference line and comprises a straight line, a polygonal line and/or a curved line;

providing a plurality of virtual reference points at predetermined positions on the second virtual reference line; and arranging an information dot the defines information by a distance and a direction from the virtual reference point at an end point of a vector expressed with the virtual reference point as a start point.

14. The printed medium according to claim 13, wherein a plurality of reference dots continuously arranged in lines according to the predetermined rule are arranged over at least two lines on the medium surface, more than two first virtual reference lines that connect the plurality of reference dots and comprise straight lines, polygonal lines and/or curved lines are provided corresponding to the reference dots of more than two lines, and a second virtual reference line that is defined at a predetermined position from the reference dots and/or the virtual reference lines is defined between the two or more first virtual reference lines.

15. The printed medium according to claim 12, wherein the printed medium is a side reader of a main reader, the printed medium is superimposed and printed with a text, etc. and/or an iconized text, etc. and the dot pattern corresponding to a content of at least one predetermined position of the main reader as an index of the main reader printed with a text, etc. and content information that corresponds to the content of the predetermined position of the main reader and is associated with a dot code signified by the dot pattern and stored in a storage unit of an information processing device, is output from an output unit of the information processing device by reading the dot pattern using an optical reading unit of the information processing device.

16. The printed medium according to claim 15, wherein the side reader is a booklet, a card, a bookmark, a sticker, or a foldable printed medium.

17. An information input/output method comprising the steps of:

reading a dot pattern formed on a medium surface by an optical reading unit;

by a processing unit, analyzing the dot pattern from image data of the dot pattern read out by the optical reading unit, and converting the dot pattern into a dot code that defines a code value and/or a coordinate value; and by an output unit, reading and outputting content data that is associated with the dot code converted by the processing unit and registered in a link table of a storage unit from the storage unit, wherein the link table stored in the storage unit associates and registers at least two pieces of content data and the dot code, and the information input/output method further comprises the steps of, by a control unit, instructing to refer to the link table using the dot code and continuously outputting the two or more pieces of content data, and, by the output unit, continuously outputting the content data at least twice according to the instruction.

18. The information input/output method according to claim 17, wherein the dot pattern is formed by arranging a plurality of stream dot patterns that are arrayed in accordance with the steps of:

continuously arranging a plurality of reference dots in a line according to a predetermined rule;

providing a first virtual reference line that comprises a straight line, a polygonal line and/or a curved line that connects the plurality of reference dots;

providing at least one second virtual line that is defined at a predetermined position from the reference dots and/or the first virtual reference line and comprises a straight line, a polygonal line and/or a curved line;

providing a plurality of virtual reference points at predetermined positions on the second virtual reference line; and arranging an information dot that defines X and Y coordinate values and/or a code value by a distance and a direction from the virtual reference point at an end point of a vector expressed with the virtual reference point as a start point.

19. The information input/output method according to claim 18, wherein the stream dot is further provided with a reference dot at a predetermined point as a reference for defining the second virtual reference line and/or a direction of the dot pattern and one X and Y coordinate value and/or a code value.

* * * * *